(12) United States Patent
Kaliszek et al.

(10) Patent No.: US 6,320,664 B1
(45) Date of Patent: *Nov. 20, 2001

(54) RUGGEDIZED STRUCTURE FOR FIBER OPTIC GYROSCOPE

(75) Inventors: Andrew W. Kaliszek, Phoenix; Glen A. Sanders; Clarence E. Laskoskie, both of Scottsdale, all of AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,612

(22) Filed: Dec. 31, 1998

(51) Int. Cl.[7] ................................. G01C 19/72
(52) U.S. Cl. .......................... 356/464; 356/465
(58) Field of Search .................... 356/350, 345, 356/460, 464, 465; 385/12, 14; 250/227.19

(56) References Cited

U.S. PATENT DOCUMENTS

| | | |
|---|---|---|
| 3,635,421 | 1/1972 | Boland et al. . |
| 4,445,649 | 5/1984 | Yataki et al. . |
| 5,111,518 * | 5/1992 | Okada ................... 385/14 |
| 5,371,593 | 12/1994 | Cordova et al. . |
| 5,444,534 * | 8/1995 | Dyott et al. ............ 356/350 |
| 5,546,482 | 8/1996 | Cordova et al. . |
| 5,767,970 | 6/1998 | Cordova . |
| 5,818,590 * | 10/1998 | Patterson ................ 356/350 |
| 5,923,424 * | 7/1999 | Sanders et al. ........ 356/350 |

FOREIGN PATENT DOCUMENTS

| | | |
|---|---|---|
| 0 487 509 A2 | 5/1992 | (EP) . |
| 0 488 255 A2 | 6/1992 | (EP) . |
| 0 660 082 A1 | 6/1995 | (EP) . |
| 0 699 893 A1 | 3/1996 | (EP) . |
| 0487509A2 * | 5/1992 | (EP) ............ 356/350 |
| 2-6712 * | 1/1990 | (JP) ............ 356/350 |
| WO 98 58235 A1 | 12/1998 | (WO) . |

* cited by examiner

Primary Examiner—Samuel A. Turner
(74) Attorney, Agent, or Firm—Kris T. Fredrick

(57) ABSTRACT

A rectification error reducer for a fiber optic gyroscope, which is an intensity servo or compensator for reducing vibration effects in the optical signals caused by modulation at vibration frequencies induced by the gyroscope-operating environment. The vibration effects may be detected in signals from the photodiode output in amplitude form, which is used in a control system to null out optical intensity variations at the frequencies of vibration.

53 Claims, 15 Drawing Sheets

MODULATED
PHOTODETECTOR OUTPUT

SAMPLED SYSTEM
$A_i, B_i$ ARE DIGITAL
NUMBERS

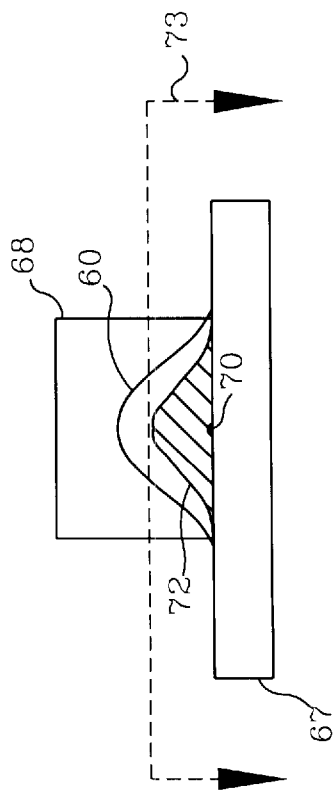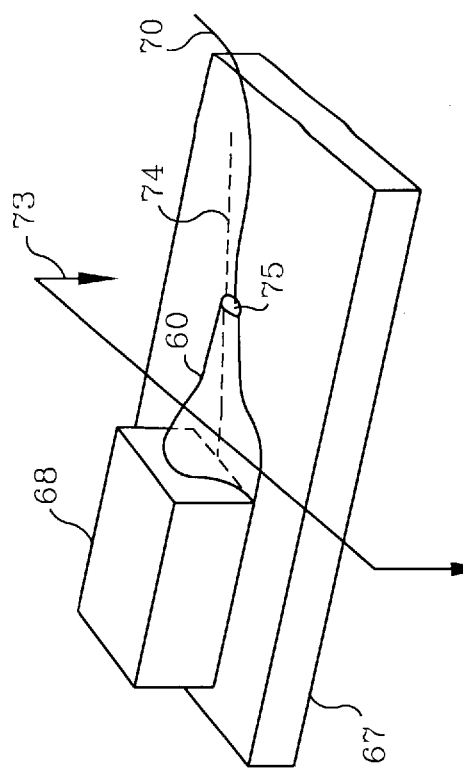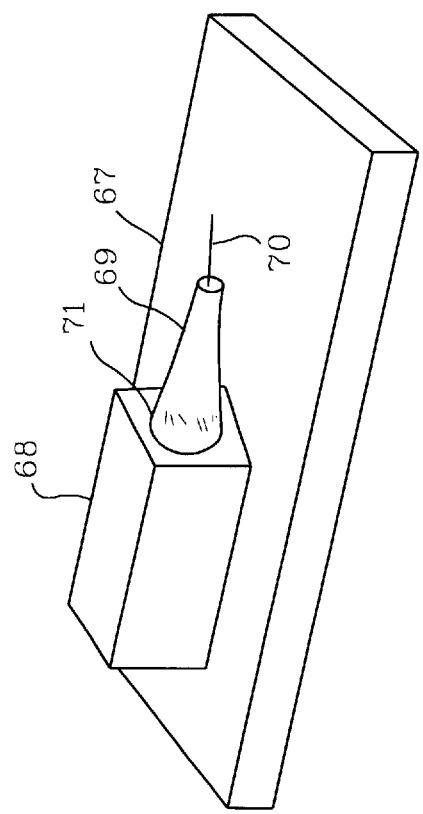
Fig.15c
Fig.15b
Fig.15a

US 6,320,664 B1

RUGGEDIZED STRUCTURE FOR FIBER OPTIC GYROSCOPE

BACKGROUND OF THE INVENTION

The present invention concerns fiber optic gyroscopes having vibration-error reduction schemes, and more particularly alleviating false indications of rotation rate due to rectification of vibration at vibration frequencies in the gyroscope operating environment.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope, as shown in FIG. 1, has a coiled optical fiber wound on a core and about the axis thereof around which rotation is to be sensed. The optical fiber is typical of a length of 50 to 2,000 meters, or so, and is part of a closed optical path in which an electromagnetic wave, or light wave, is introduced and split into a pair of such waves to propagate in clockwise (cw) and counterclockwise (ccw) directions through the coil to both ultimately impinge on a photo detector. Rotation $\Omega$ about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyroscope (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output light intensity impinging on the photo detector and hence the current emanating from the photo detector system photodiode (PD), in response to the opposite direction traveling electromagnetic waves impinging thereon after passing through the coiled optical fiber, follows a raised cosine function. That is, the output current 32 depends on the cosine of the phase difference $\phi(\Omega)$ between these two waves as shown in FIG. 2. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite-direction traveling electromagnetic waves is usually modulated by placing an optical phase modulator, or what is sometimes referred to as a bias modulator, in the optical path on one side of or adjacent to one side of the coiled optical fiber. In order to achieve sensitive detection of rotation, the Sagnac interferometer is typically biased at a frequency $f_b$ by a sinusoidal or square wave modulation of the differential phase between the counter-propagating beams within the interferometric loop. As a result, one of these oppositely directed propagating waves passes through the modulator on the way into the coil while the other wave, traversing the coil in the opposite direction, passes through the modulator upon exiting the coil.

In addition, a phase-sensitive detector PSD serving as part of a demodulator system or a digital demodulator is provided to receive a signal representing the photo detector output current. Both the phase modulator and the phase-sensitive detector can be operated by the modulation signal generator or a synchronized derivative thereof at the so-called "proper" frequency to reduce or eliminate modulator-induced amplitude modulation.

FIGS. 3a, 3b, 4a and 4b show the effect of modulation and demodulation over the raised cosine function. In FIGS. 3a and 3b, the phase difference $\Delta\phi$ of the gyroscope optical waves are modulated with a sine wave bias modulation 33 for the cases of $\Omega=0$ and $\Omega\neq0$ respectively. The resulting modulated intensity output 34 of the photo detector vs. time is shown to the right of the raised cosine function. As FIGS. 3a and 3b show, for $\Omega=0$ the phase modulation is applied symmetrically about the center of the raised cosine function and for $\Omega\neq0$ the phase modulation is applied asymmetrically. In the first case, the output is the same when the sensor is biased at point A as when it is biased at point B, giving only even harmonics of $f_b$ on the photo detector output. In the second case, the outputs at A and B are unequal, giving significant photo detector signal content at $f_b$, which is indicative of rotation rate. This signal content at $f_b$, recovered by the phase sensitive demodulator (PSD), is proportional to the rotation rate $\Omega$. The signal also changes sign for an oppositely directed rotation rate.

FIGS. 4a and 4b show the case of square wave modulation 36 for $\Omega=0$ and $\Omega\neq0$, respectively. Here, in practice, square wave modulation produces modulation transients 38 by the value of switching $\Delta\phi$ from point A to point B on the raised cosine function. These are shown by the vertical lines in the resultant modulated photo detector current vs. time, which is proportional to the optical intensity impinging on the photo detector for an ideal photo detector. Again, in the absence of rotation, the output 37 at points A and B are equal, while the presence of rotation makes the output unequal for the "A" half periods and "B" half periods.

In the square wave demodulation process depicted in FIGS. 5a, 5b and 5c, the signal component synchronous with the bias modulation frequency $f_b$ is recovered from the photo detector signal by multiplying by a square wave demodulator reference waveform 39 of zero mean, synchronized to the bias modulation. The average or DC component 41 of the resultant demodulated output 40 is proportional to rotation rate.

One other method of recovering the rotation rate, shown in FIG. 6, is that of a digital demodulation scheme where the output 37 of the photo detector in a square wave modulated system is sampled at points $A_i$ during the first half cycle and points $B_i$ during the second half cycle. The sample event is represented by an arrow. Each sample 42 is converted from an analog signal to a digital one and the difference between the digital sum of the $A_i$'s and the digital sum of the $B_i$'s is proportional to $\Omega$.

In all of these cases, the PSD/digital demodulator output is an odd function having a large rate of change at zero phase shift, and thus changes algebraic sign on either side of zero phase shift. Hence, the phase-sensitive detector PSD/digital demodulator signal can provide an indication of which direction a rotation is occurring about the axis of the coil, and can provide the large rate of change of signal value as a function of the rotation rate near a zero rotation rate, i.e., the detector has a high sensitivity for phase shifts near zero so that its output signal is quite sensitive to low rotation rates. This is possible, of course, only if phase shifts due to other sources, that is, errors, are sufficiently small. In addition, this output signal in these circumstances is close to being linear at relatively low rotation rates. Such characteristics for the output signal of the demodulator/PSD are a substantial improvement over the characteristics of the output current of the photo detector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, the high refractive index axis, i.e., the slower propagation axis, or the low index axis is chosen for propagating the electromagnetic waves depending on the other optical components in the system.

The electromagnetic waves that propagate in opposite directions through coil 10 are provided from an electromagnetic wave source, or light source 11, in FIG. 1. This source is a broadband light source, typically a semiconductor superluminescent diode or a rare earth doped fiber light source which provide electromagnetic waves, typically in the near-infrared part of the spectrum, over a range of typical wavelengths between 830 nanometers (nm) and 1550 nm. Source 11 must have a short coherence length for emitted light to reduce the phase shift difference errors between these waves due to Rayleigh and Fresnel scattering at scattering sites in coil 10. The broadband source also helps to reduce errors caused by the propagation of light in the wrong state of polarization.

Between light source 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against light source 11 at a point of optimum light emission therefrom, a point from which it extends to a first optical directional coupler 12 which may also be referred to as a optical light beam coupler or wave combiner and splitter.

Optical directional coupler 12 has light transmission media therein which extend between four ports, two on each end of that media, and which are shown on each end of coupler 12 in FIG. 1. One of these ports has the optical fiber extending from light source 11 positioned thereagainst. At the other port on the sense end of optical directional coupler 12 there is shown a further optical fiber positioned thereagainst which extends to be positioned against a photodiode 13 which is electrically connected to a photo detection system 14.

Photodiode 13 detects electromagnetic waves, or light waves, impinging thereon from the portion of the optical fiber positioned there against and provides a photo current in response to a signal component selection means 35. This photo current, as indicated above, in the case of two nearly coherent light waves impinging thereon, follows a raised cosine function in providing a photo current output which depends on the cosine of the phase difference between such a pair of substantially coherent light waves. This photo detector device will operate into a very low impedance to provide the photo current that is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port that is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization such that clockwise (cw) and counterclockwise (ccw) waves of the same polarization are introduced into sensing loop 10 and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which polarizer 15 is placed. In this regard, the high birefringence in the optical fiber used or the broad bandwidth of the light source used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bi-directional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10.

Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by either changing the index of refraction or the physical length of the transmission medium, therein to thereby change the optical path length. Such electrical signals are supplied to modulator 19 by a bias modulation signal generator 20 providing either a sinusoidal voltage output signal at a modulation frequency $f_b$ that is intended to be equal to $C_1 \sin(\omega_b t)$ where $\omega_b$ is the radian frequency equivalent of the modulation frequency $f_b$, or a square wave modulation signal at $f_b$ and $C_1$ is the amplitude of the modulation. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source 11 through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photo current $i$ proportional to the intensity of the two electromagnetic waves or light waves impinging thereon, and is therefore expected to follow the cosine of the phase difference between these two waves impinging on that diode. For sinusoidal bias modulation, the photodiode signal is given by the following equation:

$$i = \frac{I_o}{2}\eta[1 + \cos(\phi_R + \phi_b \cos\omega_b t)]$$

where $I_O$ is the light intensity magnitude at photo detector 13 in the absence of any phase difference between counterclockwise waves and $\eta$ is the detector responsivity coefficient. This is because the current depends on the resulting optical intensity of the two substantially coherent waves incident on photodiode 13, an intensity which will vary from a peak value of $I_0$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_b$ and which is intended to vary as $\cos(\omega_b t)$.

For the case of square wave modulation, the photodiode current is represented by $$i = \frac{1}{2}\eta I_o[1 + \cos(\phi_R + \phi_b)]$$

Where the amplitude of the phase difference modulation is $$\phi_b = \begin{cases} |\phi_b| & nT \le t < \left(n + \frac{1}{2}\right)T \\ -|\phi_b| & \left(n + \frac{1}{2}\right)T \le t < (n+1)T \end{cases}$$

where $n = 0, 1, 2, 3 \ldots$, and where $T$ is the bias modulation period. Optical phase modulator 19 is of the kind described above and is used in conjunction with a PSD or digital demodulator 23 as part of an overall detection system for converting the output signal of photo detection system 14, following a cosine function as indicated above, to a signal function that provides in that output signal, as indicated above, information both as to the rate of rotation and the direction of that rotation about the axis of coil 10.

Thus, the output signal from photo detection system 14, including photodiode 13, is converted to a voltage and provided through an amplifier 21, where it is amplified and passed to PSD/digital demodulator means 23. Photo detection system 14, amplifier 21, filter 22 and PSD/digital demodulator 23 constitute signal component selection means 35. PSD/digital demodulator 23, serves as part of a phase demodulation system. Such a PSD/digital demodulator 23 extracts the amplitude of the fundamental frequency $f_b$ of the photodiode 13 output signal, or the fundamental frequency of modulation signal generator 20 plus higher odd harmonics, to provide an indication of the relative phase of the electromagnetic waves impinging on photodiode 13. This information is provided by PSD/digital demodulator 23. Bias modulator signal generator 20, in modulating the light in the optical path at the frequency $f_b$ described above, also leads to harmonic components being generated by the recombined electromagnetic waves in photo detection system 14.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude of the modulation frequency component of the output signal of photo detection system 14, is expected to be set by the magnitude of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing PSD/digital demodulator 23 leaving a demodulator system (detector) output signal depending on just the amplitude scaling factor thereof.

Thus, the voltage at the output of amplifier 21 will typically appear as:

$$V_{21\text{-}out} = \frac{1}{2} I_o \eta k \{1 + \cos[\phi_R + \phi_b \cos(\omega_b t + \theta)]\}$$

for sine wave modulation. The constant k represents the gains through the system to the output of amplifier 21. The symbol $\theta$ represents additional phase delay in the output signal of amplifier 21 at $\omega_b$ with respect to the phase of the signal at $\omega_b$ on the photo current. This phase shift is thus introduced in photo detection system 14. The other symbols used in the preceding equation have the same meaning as they did in the first equation above.

The foregoing equation can be expanded in a Bessel series expansion to give the following:

$$\begin{aligned}V_{21\text{-}out} = \frac{1}{2} I_o \eta k &\Big\{ [1 + J_0(\varphi_b)\cos\varphi_R] - \\ & 2J_1(\varphi_b)\sin\varphi_R\cos(\omega_b t + \theta) - \\ & 2J_2(\varphi_b)\cos\varphi_R\cos 2(\omega_b t + \theta) + \\ & 2J_3(\varphi_b)\sin\varphi_R\cos 3(\omega_b t + \theta) + \\ & \sum_{n=2}^{\infty} [(-1)^n 2 J_{2n}(\varphi_b)\cos\varphi_R\cos 2n(\omega_b t + \theta) - \\ & (-1)^n 2k J_{2n+1}(\varphi_b)\sin\varphi_R\cos(2n+1)(\omega_b t + \theta)]\Big\}\end{aligned}$$

This signal at the output of amplifier 21 is applied to the input of PSD as is the signal from bias modulator generator 20, the latter again intended to be equal to $C_1 \sin(\omega_b t)$ where $\omega_b$ is the radian frequency equivalent of the modulation frequency $f_b$. Assuming that PSD 23 picks out only the signal of interest at $\omega_b$, the output of that detector with such a generator 20 output signal will then be the following:

$$V_{23\text{-}out} = I_o \eta k' J_1(\phi_b) \sin \phi_R$$

The constant k' accounts for the system gains from photo detector 13 output current through PSD/digital demodulator 23.

A similar result is obtained for square wave bias modulation where the photo current is $$i = \begin{cases} \frac{1}{2} I_o \eta [1 + \cos\phi_R \cos|\Delta\phi_b| - \sin\phi_R \sin|\Delta\phi_b|] & t_1 \le t < t_2 \\ \frac{1}{2} I_o \eta [1 + \cos\phi_R \cos|\Delta\phi_b| + \sin\phi_R \sin|\Delta\phi_b|] & t_2 \le t < t_3 \end{cases}$$

where
$t_1 = nT$
$t_2 = (n+\frac{1}{2})T$
$t_3 = (n+1)T$
and
$n = 0, 1, 2, \ldots$
and the output of PSD 23 will be $$V_{23\text{-}out} = K'' I_o \eta \sin \phi_R \sin |\Delta\phi_b|$$

where K" is a constant of proportionality that includes the amplifier gains between the photo detector 14 current output and the PSD 23 output. As can be seen from these equations, the output of PSD/digital demodulator 23 depends on the rotation rate.

However, there may be error terms that may prevent the device from achieving the expected results in the system of FIG. 1. One reason for failing to achieve the expected results is that bias modulation signal generator 20, in modulating the light in the optical path at frequency $f_b$ as described above through phase modulator 19, not only results in harmonic components being generated in photo detection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_b$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photo detector signal. The value of the "proper" frequency can be determined from the length of the optical fiber and the equivalent refractive index therefor.

The resulting signal output of PSD 23 follows a sine function, i.e., the output signal depends on the sine of the phase difference between the two electromagnetic waves impinging on the photodiode 13, primarily the phase shift due to rotation about the axis of the coil 10. A sine function is an odd function having its maximum rate of change at zero, and so changes algebraic sign on either side of zero. Hence, the phase sensitive demodulator signal can provide both an indication of which direction a rotation is occurring about the axis of coil 10, and can provide the maximum rate of change of signal value as a function of rotation rate near a zero rotation rate, i.e., has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator 23 are a substantial improvement over the characteristics of the output current of photo detector 14.

Nevertheless, the phase sensitive demodulator 23 output, in following a sine function, results in an output that at rotation rates further from zero, is less and less linear. The output does not become linear again until large enough rotation rates are encountered that give optical phase difference shifts of $\phi_R = \pm m\pi$, where m is an integer. In fact, the output of demodulator 23 is zero at $\phi_R = 0$ or $\phi_R = \pm m\pi$ and linear in regions close to these values. There is a strong desire to operate the gyroscope at a null, thereby gaining a gyroscope scale factor that is independent of the output signal size, gains of the electronics and having phase sensitive demodulator 23 stay within its linear operation region near its null condition.

This can be accomplished by adding a further phase modulator 19, or frequency shifter, near the end of the coil 10 in an optical path portion used by the opposite direction traveling electromagnetic waves propagating through the coiled optical fiber 10 to reach the photo detector 13. This phase modulator 19, or frequency shifter, is operated in a feedback loop from the photo detector system 14, i.e., the so-called rate loop, and provides sufficient negative feedback such that phase modulator 19 introduced phase change $\phi_f$ is just enough to cancel the phase shift difference between the opposite traveling direction electromagnetic waves resulting from a rotation about the axis of the coiled optical fiber 10 or enough such that $$\phi_f = -\phi_R \pm m\pi.$$

The resultant photo detector 13 current in such a closed loop system can now be represented as $$i = \frac{I_o \eta}{2}[1 + \cos(\phi_R + \phi_f + \phi_b \cos \omega_b t)]$$

for the sine-wave modulated system, and hence if $\phi_f = -\phi_R \pm m\pi$, then it can be shown that $V_{23\text{-}out}=0$. Likewise, in the case of square wave demodulation $$i = \begin{cases} \frac{1}{2} I_o \eta [1 + \cos(\phi_R + \phi_f)\cos|\phi_b| - \sin(\phi_R + \phi_f)\sin|\phi_b|] & t_1 \le t < t_2 \\ \frac{1}{2} I_o \eta [1 + \cos(\phi_R + \phi_f)\cos|\phi_b| + \sin(\phi_R + \phi_f)\sin|\phi_b|] & t_2 \le t < t_3 \end{cases}$$

and $V_{23\text{-}out}=0$ when the closed loop system adjusts $\phi_f = -\phi_R \pm m\pi$.

As a result of the rate loop, there will be little net average phase shift $\phi_N = \phi_f + \phi_R$ from $0 \pm m\pi$ occurring at photo detector 13 except for transient rotation rate changes, and so little net average phase shift sensed by phase sensitive demodulator 23. Thus, the DC-averaged output signal of this phase sensitive demodulator 23 will always be near to, or at, zero. This is true, because the feedback gain of a typical servo loop is extremely high near frequencies close to zero. The signal from a generator 20 connected to phase sensitive demodulator 23 for operating this additional phase modulator 19, through providing a signal directing the modulator to provide a particular phase shift sufficient to cancel the phase shift due to rotation or make $\phi_f = -\phi_R \pm m\pi$ will thus contain within it or a related signal the information as to the magnitude and direction of the rotation rate and the value of m.

Several forms for the output signal from the generator 20 connected to phase sensitive demodulator 23 in the rate feedback loop have been suggested for operating this additional optical phase modulator 19. One common and good choice is to use a serrodyne generator, which applies a sawtooth-like signal to optical phase modulator 19. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave modulator 19 with its frequency translated by an amount equal to the frequency of the sawtooth signal. A non-ideal sawtooth signal will not result in pure frequency translation, there instead will be added harmonics generated which can be kept small by providing very nearly an ideal sawtooth waveform of $2\pi$ amplitude and by careful design of the modulator.

Another type of modulation waveform is called a dual ramp waveform that consists of a linear ramp of positive slope followed by a ramp of negative slope. In this case, the feedback loop alternately locks to $\phi_N = -\pi$ and $\phi_N = +\pi$ or more generally to $\phi_N = m\pi$ and $\phi_N = (m+2)\pi$. In the absence of rotation, the slope magnitudes of the up-ramp and the down-ramp are equal. In the presence of rotation, the slope magnitudes are different with the magnitude of the difference in slopes between the two ramps being proportional to the rotation rate magnitude. Which ramp, the up-ramp or the down-ramp, has the greater slope magnitude is an indication of rotational directions. This technique has the performance advantage that there is no fast fly-back required in the phase shifter voltage as is the case with the serrodyne waveform.

The following discussion will assume the use of serrodyne feedback modulation for the purposes of illustration, but dual ramp or other modulation schemes could be used as well. In addition, it is recognized that the bias modulation and the feedback ramp may be added together and applied to a single or multiple phase modulators.

Since optical phase modulator 19 so operated will be on one side of the coiled optical fiber 10, one of the electromagnetic waves will have its frequency translated upon entering coil 10 while the other will not have its frequency translated until it exits the coil. Hence, one wave traverses the loop having a higher frequency than the other (though both have the same frequency on reaching the photo detector) with the result that, for a fixed modulator (or serrodyne generator) frequency, one will have a phase shift with respect to the other at photo detector 13 in an amount set by the frequency of the sawtooth and the optical length of the fiber of $2\pi\tau\Delta f$. Here, $\Delta f$ is the modulator 20 or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

One example of a rate feedback loop is shown in FIG. 7. Rather than to the rotation rate indicator of FIG. 1, the signal from phase sensitive detector 23 goes to servo electronics 24 which is incorporated in FIG. 7. In response to such phase difference, servo electronics 24 outputs a phase ramp signal 25 provided by a loop closure waveform generator 29 that supplies the phase ramp to modulator 19 in the form of signal 28 to phase-shift one beam relative to the other beam so as to bring the beams in phase with each other. A signal either from the servo electronics 24 or loop closure waveform generator 29 contains the magnitude and sign of the phase difference between optical waves. Summing amplifier 27 also supplies in signal 28 the bias modulation signal to this phase modulator 19. The feedback signal required to return beams into phase, such as the frequency of the sawtooth in the serrodyne modulation case, is an indication of the rate of rotation of sensing loop. In this closed loop case the modulator of choice is typically a phase modulator 19 on an integrated optic chip (IOC) 30 shown in FIG. 7 in order to accommodate the necessary high frequency content of the desired phase ramp signal which may be a sawtooth or a dual-ramp-type triangular wave. The signal 25, indicative of rotation, is then supplied to a rotation rate indicator 26, which provides a convenient and readily useful indication of rotation rate of loop. In the case of employing a phase modulator 19 on an integrated optical chip (IOC) 30 it is also convenient to implement coupler function 17 of FIG. 1 as a y-junction 31 on the IOC and to implement the polarizer 15 on the IOC chip or construct the IOC wave guides using a single polarization design. Y-junction 31 may be regarded as an optical light wave or beam splitter/combiner, like that as of coupler 12.

In general, there may be reasons why the fiber optic gyroscope does not give the expected rotation sensing accuracy. One of these is due to the presence of vibration. There may be vibration-induced periodic stretching of the fiber or periodic strain in the interferometer loop after the light is split into two waves to counterpropagate around the sensing coil 10 can cause a periodic phase difference modulation to the two light waves if the strain response to vibration is not equally applied to all fiber points located symmetrically in the sensing loop; that is, points located symmetrically from the center of the loop. This time varying phase difference shift $\delta$ at the vibration frequency $f_v$ of amplitude $\Delta\phi_v$ can be written as $$\delta = \Delta\phi_v \cos(\omega_v t + \epsilon)$$

where $\omega_v = 2f_v$ and $\epsilon$ is an arbitrary phase. In this case, the error due to $\delta$ itself is a rapidly varying function with a zero mean, and averages to zero and does not cause a time-averaged error. As long as $\Delta\phi_v$ is small, this error in itself does not cause a large problem in most applications. Another cause of optical phase difference shift $\delta$ at angular frequency $\omega_v$ due to vibration is that of an actual angular or torsional vibration which induces a true AC rotation rate. This effect takes the same functional form for a vibration-induced phase difference modulation $$\delta = \Delta\phi_v \cos(\omega_v t + \epsilon)$$

and the output of the gyroscope will correctly indicate the actual rotation rate environment by having its output suitably vary at $\omega_v$. Again, it must be noted that ideal gyroscope operation would indicate no DC or average rotation rate when the input rate was assumed to be an AC phenomena for this case. However, in either of the two above situations, the presence of other synchronously-induced vibration effects in the gyroscope, (in combination with the phase difference modulation $\delta$) may cause a rectified error with a non-zero average value which does appear falsely as an indication of steady state rotation rate. One such secondary effect is that of vibration-induced second harmonic phase modulation in the optical circuit that is synchronously related to the phase modulation $\delta$ at $\omega_v$. This may be due to the mechanical excitation of fiber fixed at two ends similar to that of a guitar string, in which vibration at $\omega_v$ excites elongation of the fiber inside the interferometer loop at $\omega_v$ and $2\omega_v$ simultaneously. If this is applied to fiber segments that are located asymmetrically with respect to the center of the loop, phase difference modulations between clockwise and counterclockwise light waves occur at both $\omega_v$ and $2\omega_v$, which can be represented by $$\delta_1 = \Delta\phi_v \cos(\omega_v t)$$

$$\delta_2 = \Delta\phi_{2v} \cos(2\omega_v t + \epsilon)$$

Neglecting steady state or DC rotation rate to simplify the mathematical analysis, the error due to vibration can be derived by noting that the output of the preamplifier for a square wave bias modulation system is given by $$V = \begin{cases} 1 + \sin[\delta_1 + \delta_2], & nT \le t \langle (n+1/2)T \\ 1 - \sin[\delta_1 + \delta_2], & (n+1/2)T \le t \langle (n+1)T \end{cases}$$

where $V_O$ is a constant related to the preamplifier gain and the optical power. In the above equation, T is the period of the bias modulation signal, which was at a frequency $f_b$ and amplitude of $\pi/2$. The input to demodulator 23, which selects the signal component at $f_b$, can be shown to be of the form $$V_i = V_p \cos(\omega_b t) \sin(\delta_1 + \delta_2)$$

where $\delta_1$ and $\delta_2$ can be represented as $$\delta_1 = \Delta\phi_v \sin[\sin \omega_v \tau/2] \cos[\omega_v t]$$

$$\delta_1 = \Delta\phi_v \sin[\sin 2\omega_v \tau/2] \cos[2\omega_v t + \epsilon]$$

The output of the demodulator selects the frequency component at $f_b$ of signal $V_i$. This can be shown by $$V_i(\omega_b) = V_{io} \cos(\omega_b t)(\cos \epsilon) \Delta\phi_{2v}(\Delta\phi_v)^2$$

where $V_{io}$ is a constant of proportionality. Hence, if $\Delta\phi_{2v}$ and $(\Delta\phi_v)^2$ are non-zero, there is a rectified bias error, i.e., an erroneous indication of rotation rate.

The rectified error or bias is a result of the phase difference modulation of amplitude $\Delta\phi_1$ at $\omega_v$ and the phase difference modulation at $2\omega_v$ of amplitude $\Delta\phi_{2v}$. Note that in a typical gyroscope application device bandwidths of around a few hundred hertz are required. By merely low-pass filtering the output any terms in the kHz range may be attenuated. However the rectified error, due to vibration in the kHz or higher region, will not be removed and will cause errors.

Bias error is related to dynamic differential strain (vibration). Environmental factors affect the accuracy of the measured rotation rate by the fiber optic gyroscope. Such environmental effects include vibration. Time-varying vibration induced mechanical strain gradients, asymmetric in respect to the optical center of the interferometer loop, affect the optical path lengths of two counter-propagating waves, generating a phase shift. This phase shift error, indistinguishable from rotation-induced signal, introduces a bias error. The vibration-induced phase error in the open loop fiber optic gyroscope can be derived directly from the Shupe equation (Ref [1]) in the form noted here. (See D. M. Shupe, "Thermally induced nonreciprocity in the fiber-optics interferometer", *Applied Optics*, Vol. 19(5), 1980

$$\Delta\Phi = \frac{2\pi n^2}{\lambda \cdot c} \cdot \int_0^L (2l - L) \cdot dl \cdot \frac{\partial \varepsilon(l, t, \omega)}{\partial t}$$

Where:

$\Delta\Phi$ – phase shift error (bias error)

$n$ – reflective index $\lambda$ – light wavelength $\varepsilon$ – longitudinal stain in fiber $c$ – light velocity in vacuum $l$ – distance of the infinitesimal length from the end of the interferometer loop $L$ – total length of interferometer loop $t$ – time $\omega$ – angular frequency of vibration Analysis of the above equation indicates that the vibration induced phase error is related to the occurrence of the differential dynamic longitudinal strain in two infinitesimal lengths of the fiber equidistant from the center of the interferometer loop.

SUMMARY OF THE INVENTION

In fiber optic gyroscopes, typically there are several elements in the interferometer loop. These elements and their packaging can produce errors in the gyro because of their motion relative to one another. In the past, no attention has been paid to the mechanical packaging of the depolarized gyroscope. A conventional package for a depolarized gyroscope 45, having depolarizer 43, is shown in FIG. 8*b*. The package may have several package ports bolted or attached to each other: a coil bobbin 46 to hold coil 10; a base or baseplate 47 to hold several elements including IOC 30, source 11, coupler 12 and the bundles of fibers comprising depolarizer 43; a cover 48; and a separate piece to hold depolarizer fibers or other elements.

The issue is that there should not be relative motion between the structures holding IOC 30, coil 10 and depolarizer 43 in a vibrational environment. This relative motion causes fibers between them to stretch at a vibration frequency and potentially at twice the vibration frequency. This causes an error at DC known as a bias, or a false indication of rotation rate. Dissimilar resonances of component mounting structures can cause this problem.

The present invention has several structural features that solve the error-creating motion problem. First, the IOC, the depolarizers and the coil are mounted on a package that causes these elements to vibrate with a common deflection mode. This is true of the leads between them. This eliminates relative motion and errors due to relative motion between them. Second, the servo loop should have high gain at not just the vibration frequency of interest, but also twice that frequency. Third, damping material should be applied to all leads between the IOC, the coil and the depolarizer. Transitions between components should not allow fiber leads to be hand-bonded between at two separate points, that cause fiber kinking under vibration and second harmonic modulation. Embodiments described below effect these features of the invention.

BRIEF DESCRIPTION OF THE DRAWINGS

FIGS. 15*a*, 15*b*, 15*c* and 15*d* show examples of minimizing and eliminating vibration of fiber optic leads.

DESCRIPTION OF THE EMBODIMENTS

Figure 1:
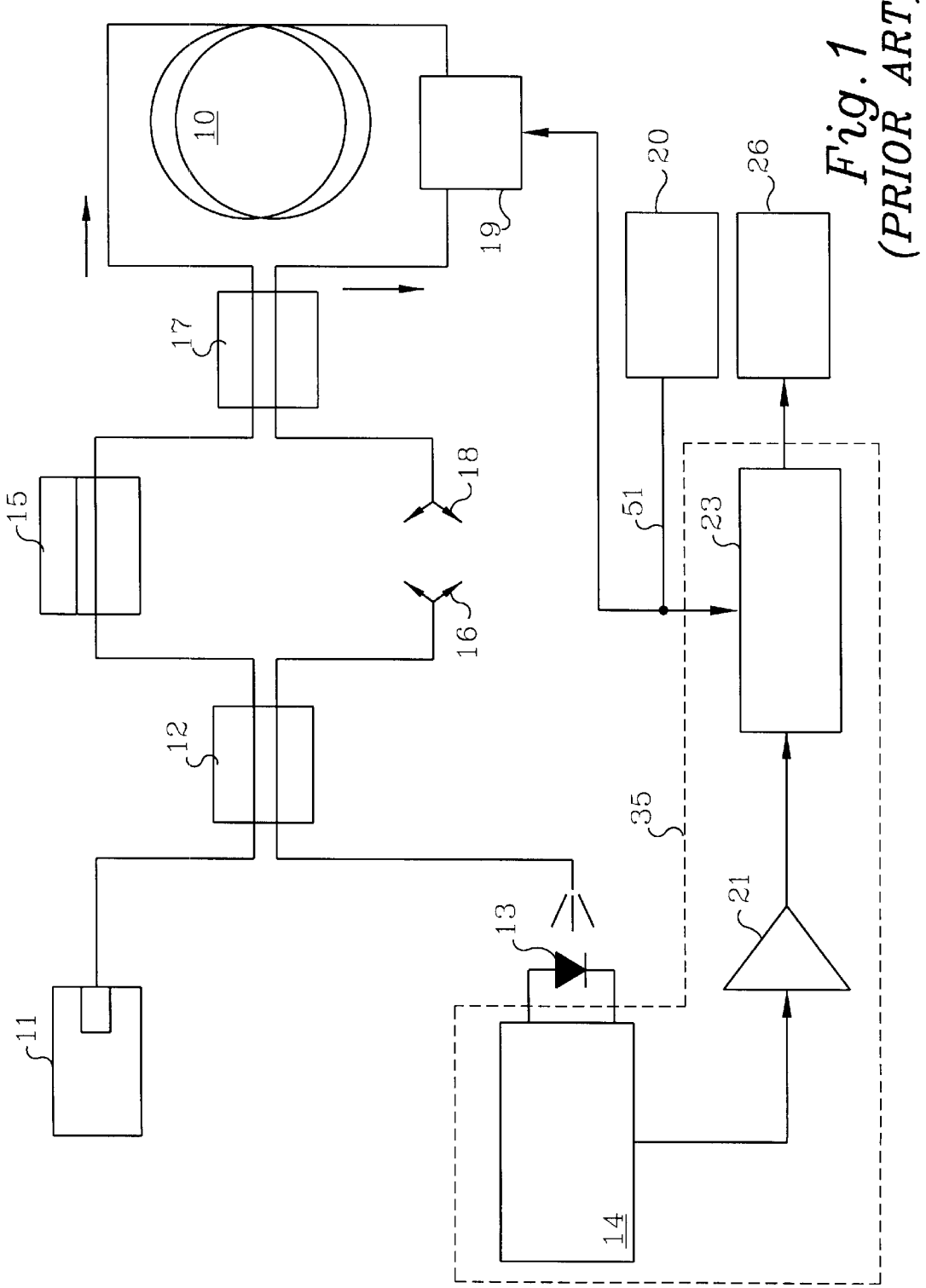
FIG. 1 shows a basic interferometric fiber optic gyroscope.
Figure 2:
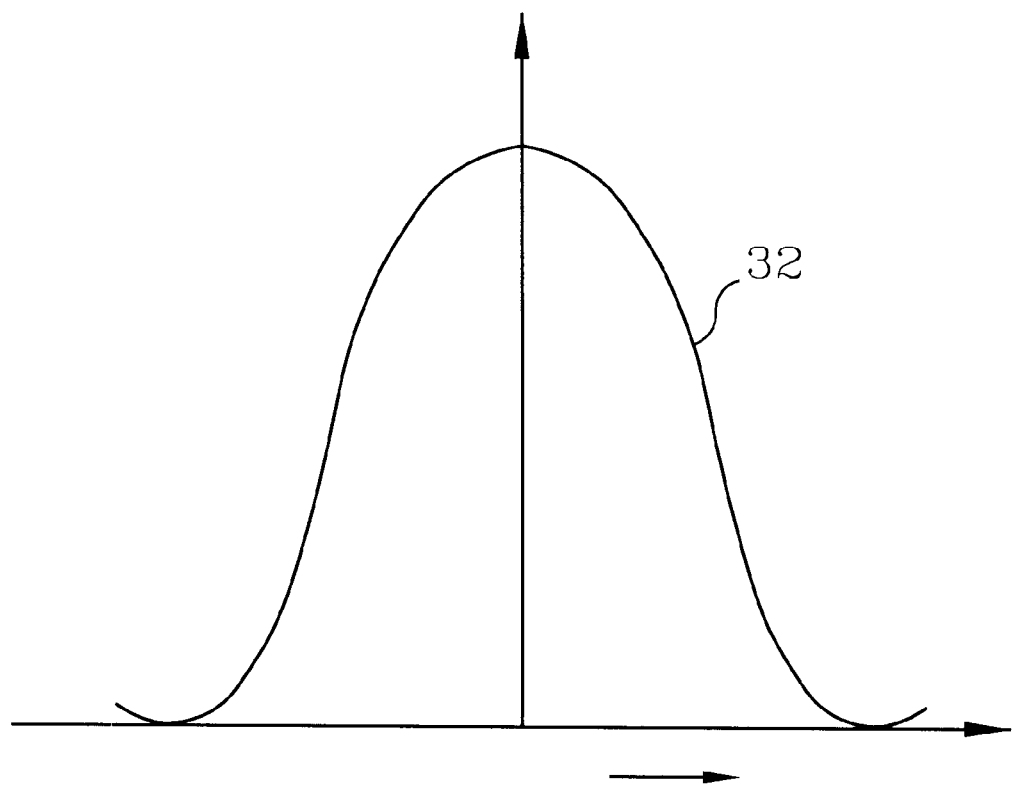
FIG. 2 is a graph of detected optical intensity or output current of a photo detector versus phase difference of counterpropagating light waves in the sensing coil of a fiber optic gyroscope.
Figures 3A, 3B:
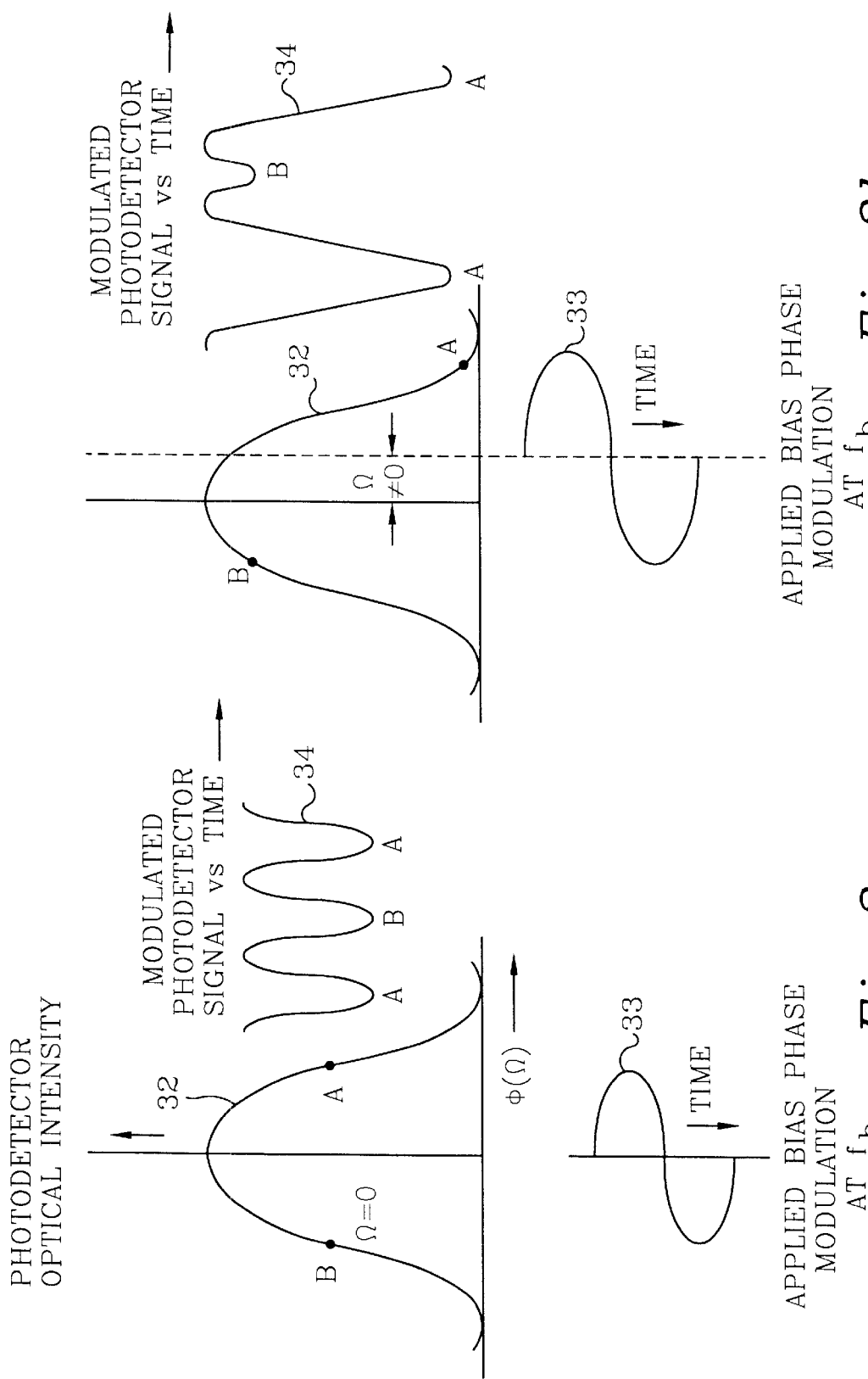
FIGS. 3*a* and 3*b* show the phase differences of the optical light waves and outputs of the gyroscope for zero and non-zero rotation rates, respectively.
Figure 4A:
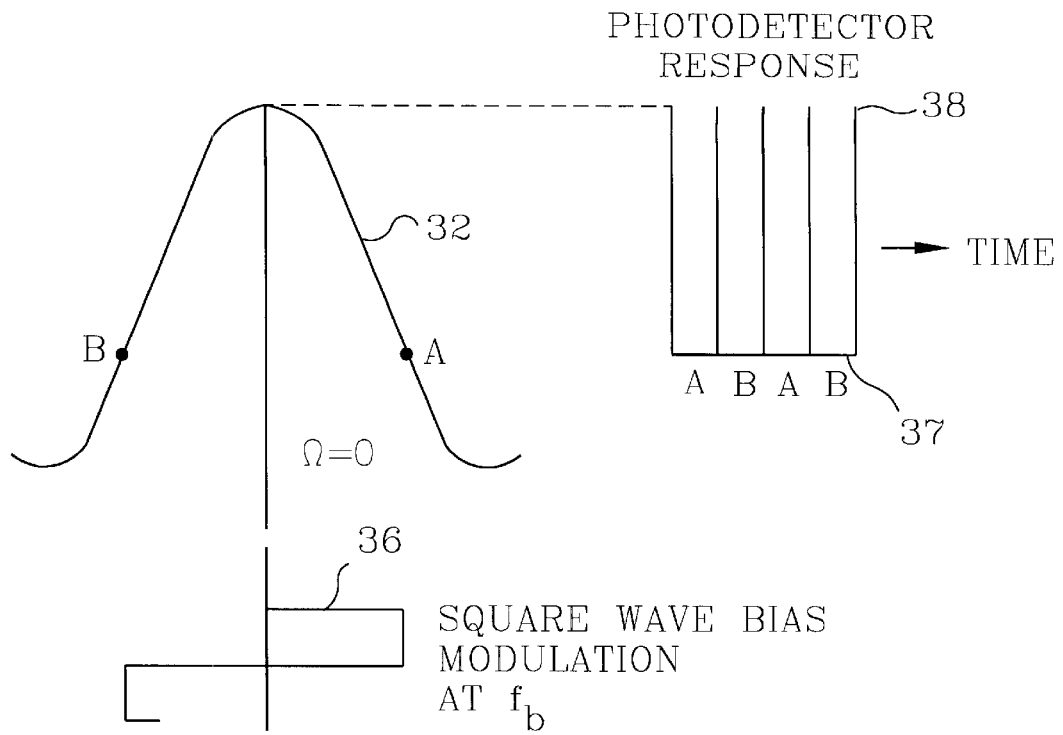
FIGS. 4*a* and 4*b* reveal the phase differences of the optical waves and outputs of the gyroscope for zero and non-zero rotation rates, respectively, for square wave modulation.
Figure 4B:
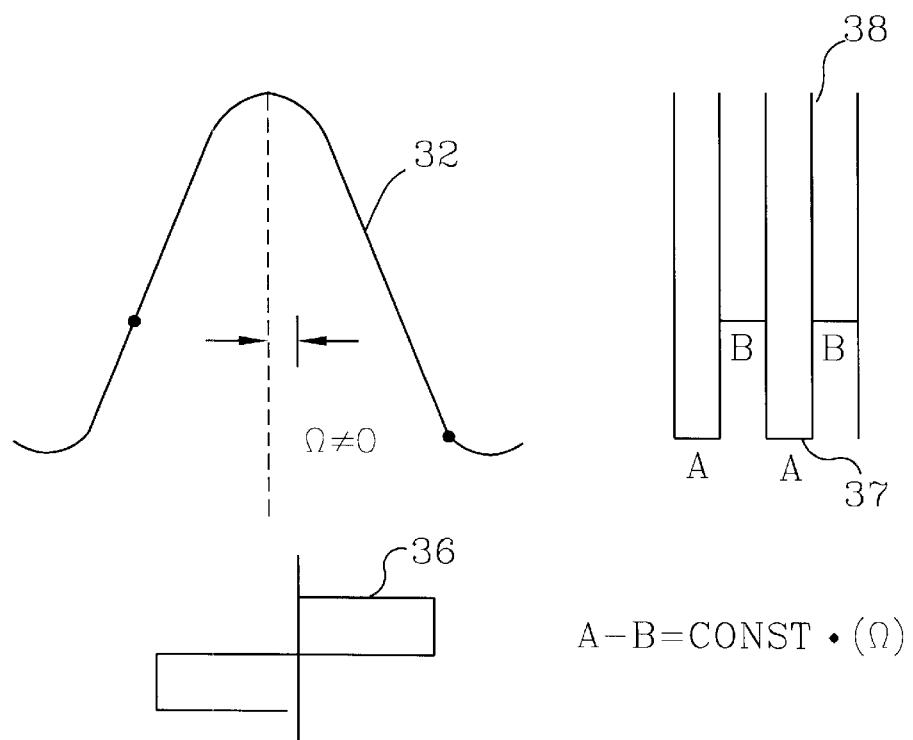
Figure 5A:
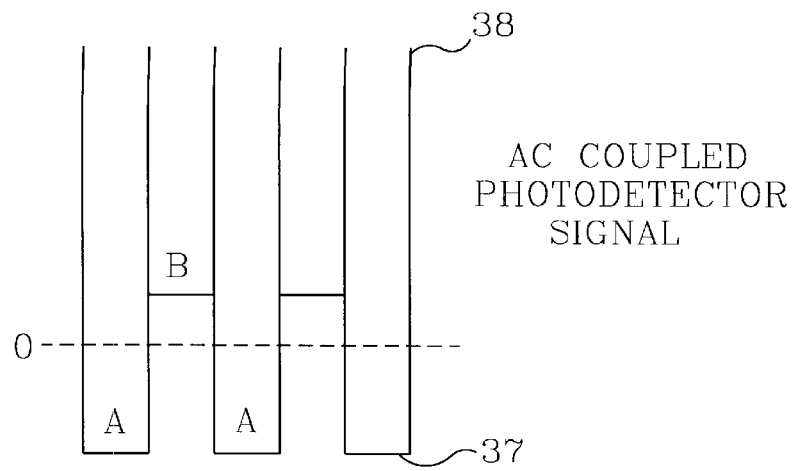
FIGS. 5*a*, 5*b* and 5*c* show signal components synchronous with the bias modulation signal.
Figure 5B:
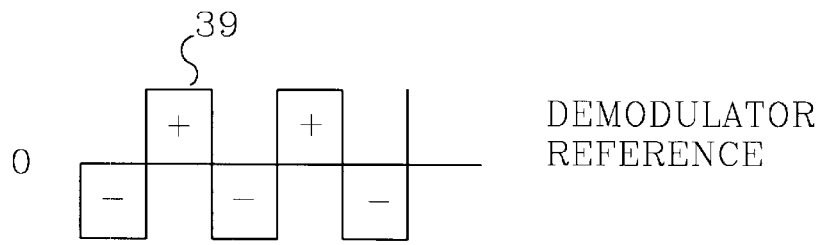
Figure 5C:
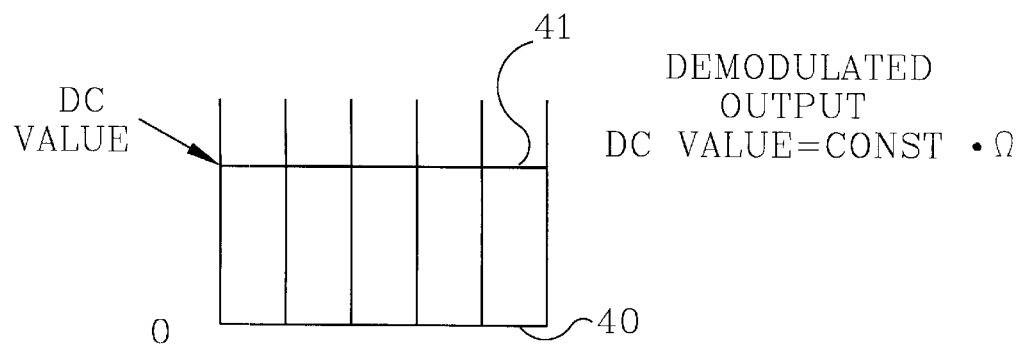
Figure 6:
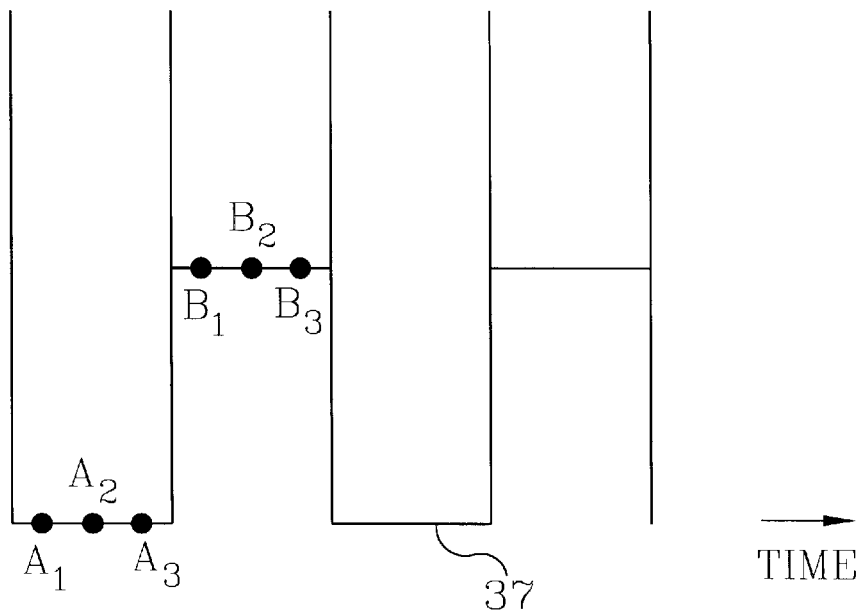
FIG. 6 reveals a sampling scheme for a photo detector output.
Figure 6:
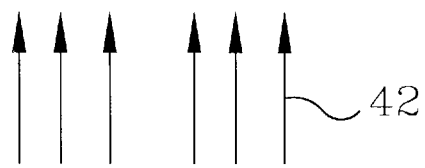
Figure 7:
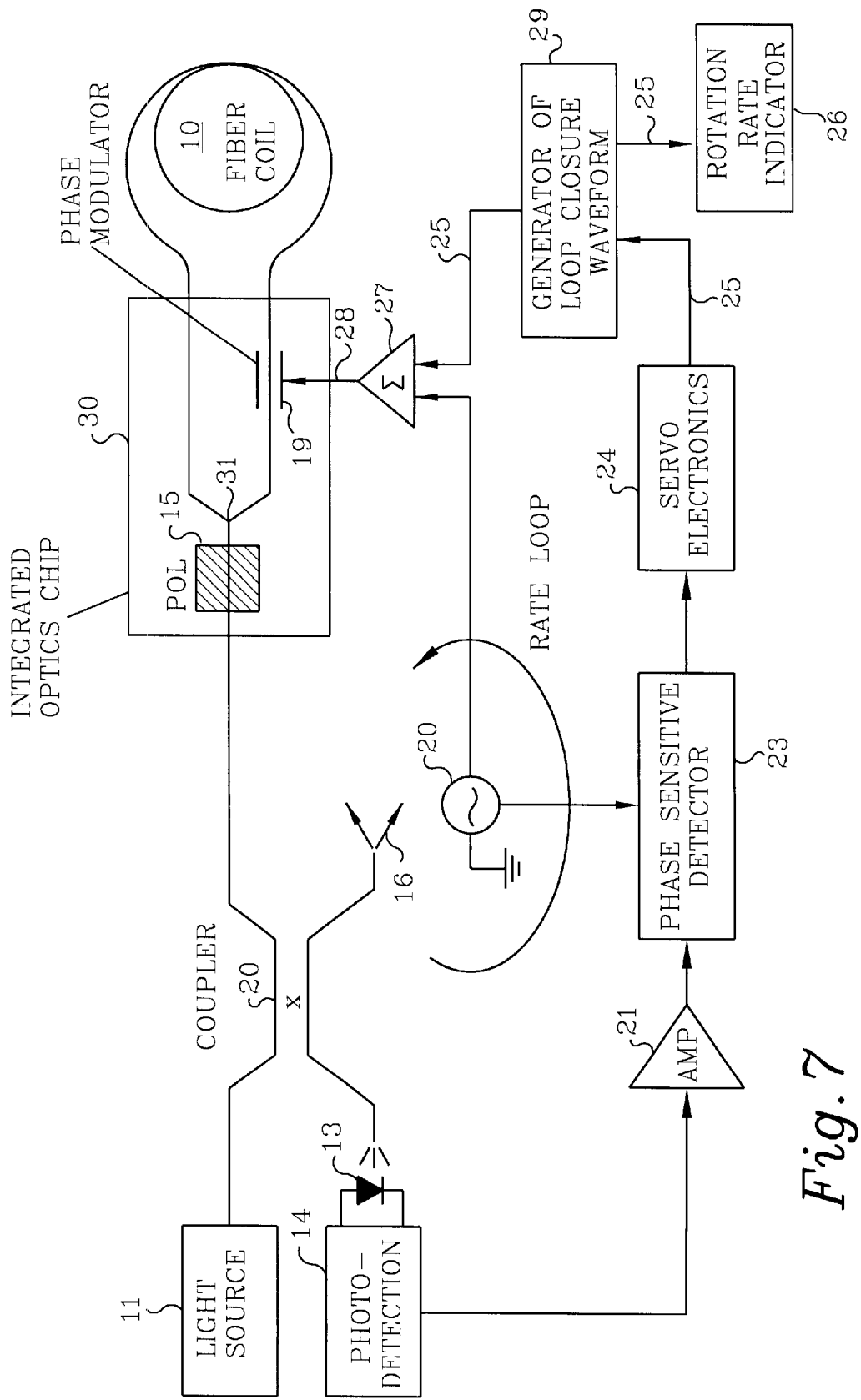
FIG. 7 shows an interferometric fiber optic gyroscope having a rate feedback loop and a polarization maintaining fiber coil.
Figure 8A:
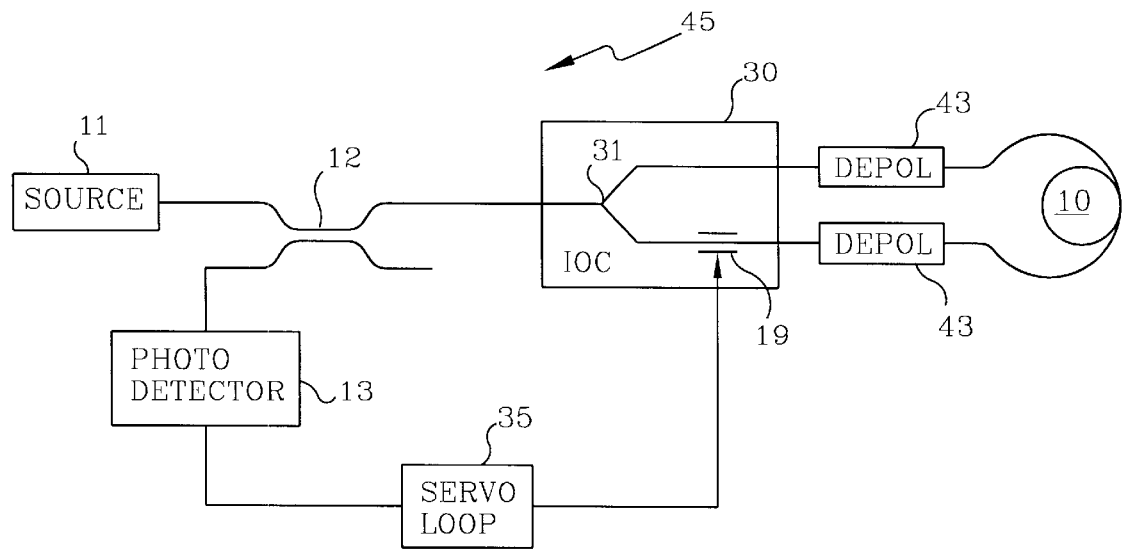
FIG. 8*a* is a depiction of a depolarized interferometric fiber optic gyroscope with fiber optic depolarizers, single mode coil fiber and a rate servo loop.
Figure 8B:
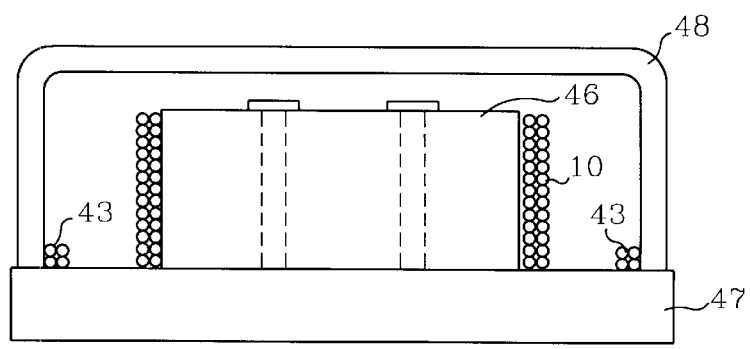
FIG. 8*b* is a cross-section of a typical package of a depolarized gyroscope.

The present invention pertains to the suppression of vibration and its effects in fiber optic gyroscopes. FIG. 8*a* shows a basic schematic of a depolarized fiber optic gyroscope. Source 11 emanates light 61 through coupler 12 to splitter 31 of integrated optical circuit 30. Splitter splits light 61 into beams 62 and 63 that counterpropagate in sensing loop 10. Beams 62 and 63 return from loop 10 and are combined at splitter 31 into a beam 64. At least a part of beam 64 goes to photodetector 13. Beam 64, or part of it, is converted into an electrical signal that is representative of light beam 64 which has an intensity indicative of phase relationship of beams 62 and 63. The output of photodetector 13 goes to electronics circuit 59 which includes a bias modulation generator. Electronics circuit 59 may include closed or open loop electronics. The output of circuit 59 may be only a bias modulation signal for an open loop configuration or a feedback signal, incorporating the bias modulation, the phase modulator 19. Modulator 19 modulates beam 62 as it returns from loop 10 and modulates beam 63 as it enters loop 10. IOC 30 also includes a polarizer to polarize light beams 61 and 63. Depolarizer 43 depolarizes beams 62 and 63. These polarizers may be Lyot polarizers.

This invention relates to attenuation of the rectified bias error through reduction of the vibration effects that induce phase modulation $\omega_v$ and $2\omega_v$, simultaneously. This can be-effectively accomplished by using supporting structures and fastening techniques in the gyroscope that do not simultaneously excite strain variations in the fiber loop at adjacent harmonics, e.g., at both $\omega_v$ and $2\omega_v$. Secondly, the thrust of this invention is to attenuate both the net phase difference modulation at $\omega_v$ and $2\omega_v$, by enhancing the speed of the main servo loop used for closed loop operation. This particularly useful for, but not limited to, depolarized gyroscopes, which have several elements such as depolarizers in the Sagnac sensing loop. The problem with conventional fiber optic gyroscopes is that packaging techniques have not previously specifically and adequately addressed the vibration rectification error caused by the mixing of the first and second harmonic phase difference modulation.

Figure 10:
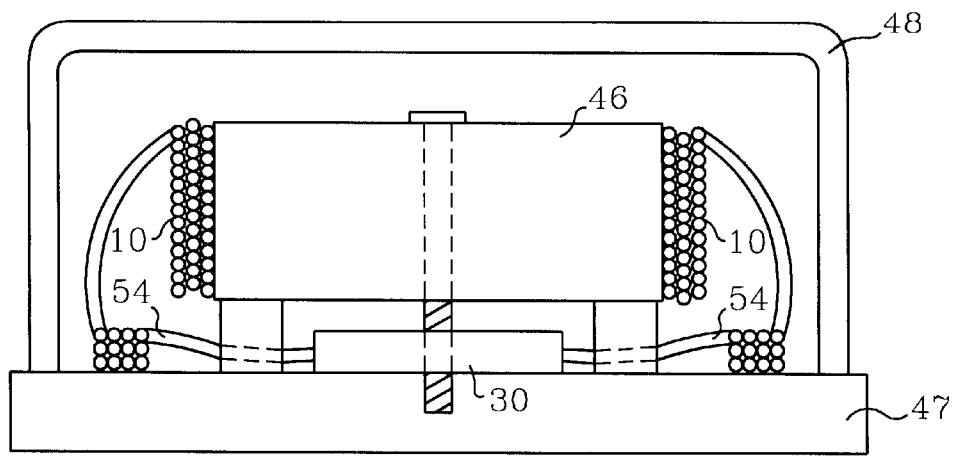
FIG. 10 shows a conventional package for a depolarized gyroscope using fiber depolarizers and a single mode fiber sensing coil.
Figure 9:
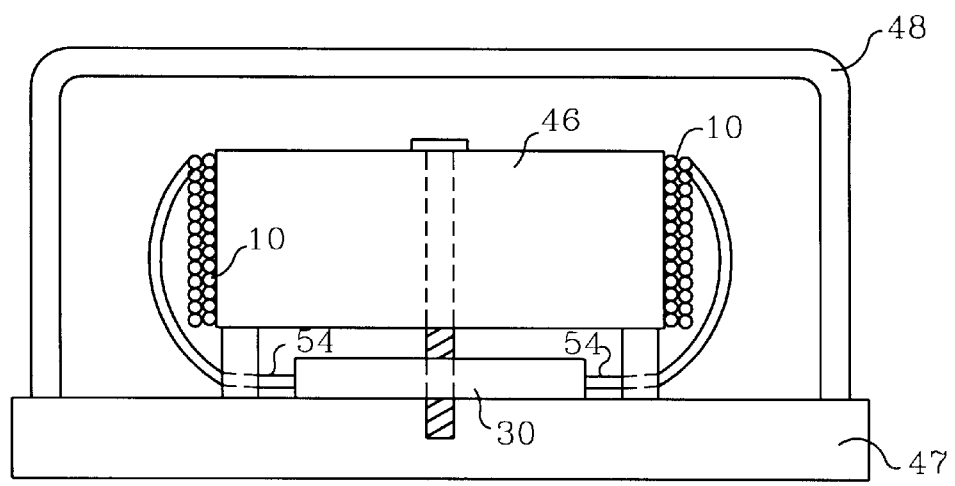
FIG. 9 shows a conventional package for a gyroscope using a polarization maintaining fiber coil.

The conventional packages shown in FIGS. 9 and 10 for PM and depolarized gyroscopes, respectively, have optical elements, which are located in the interferometric loop, located on package elements that may resonate at different frequencies in a vibration environment causing relative motion between them. This can produce strain in the fibers connecting them. Depending on the geometry of those fibers, both first harmonic and second harmonic phase difference modulation may be produced. Proper fastening and damping of the fibers may attenuate these effects, but not sufficiently eliminate them.

Far better designs are the subject of this invention, in which components including coil 10 on bobbin 46, integrated optical circuit 30, depolarizers 43 (in the depolarized case) and the leads connecting them, are located on a common single structure 47 having a shell 48, within the gyroscope package. In this way, all the elements experience a common deflection under vibration and there is no relative motion between the principal elements. Nevertheless, it is still important to fasten the leads with bends and damping material so as to discourage motion at the even harmonics $2n\omega_v$, of vibration frequency $\omega_v$, where n=1, 2, 3 . . . . Such improved structures are shown in FIGS. 11a, 11b, 12a and 12b for the depolarized case and in FIGS. 13a and 13b for the PM case.

Figure 11B:
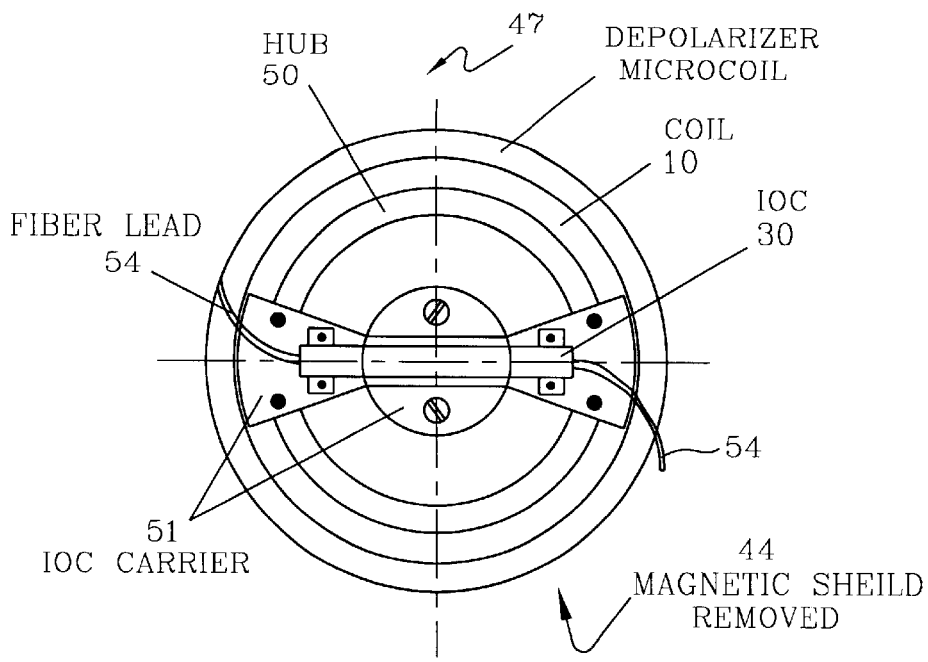
FIGS. 11*a*, 11*b*, 12*a* and 12*b* show improved depolarized gyroscope package configurations.
Figure 11A:
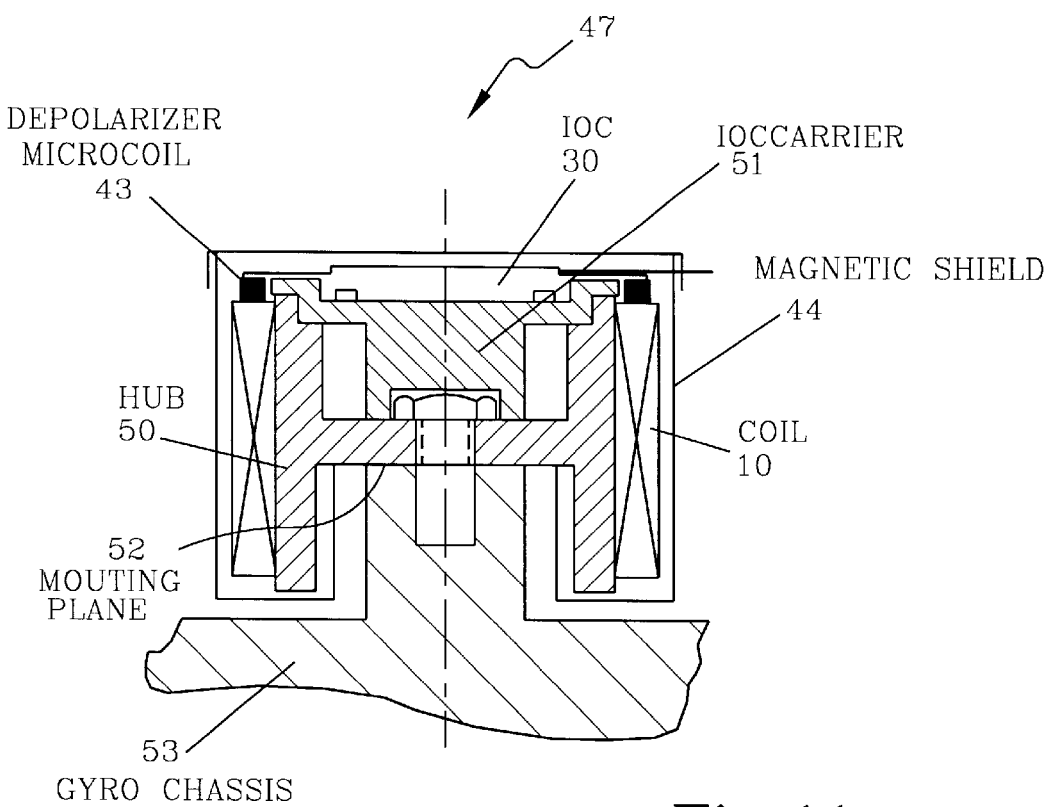
Figure 12B:
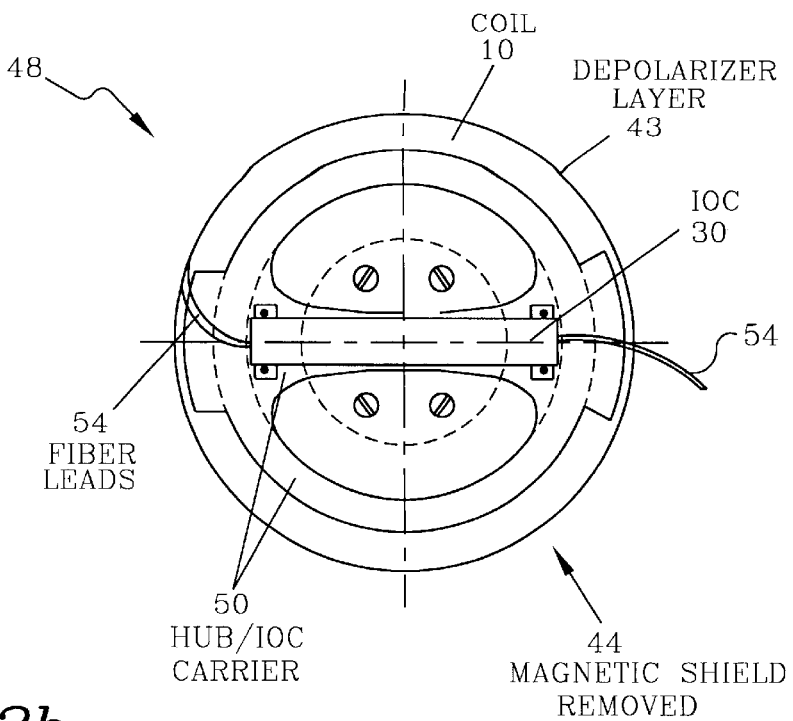
Figure 12A:
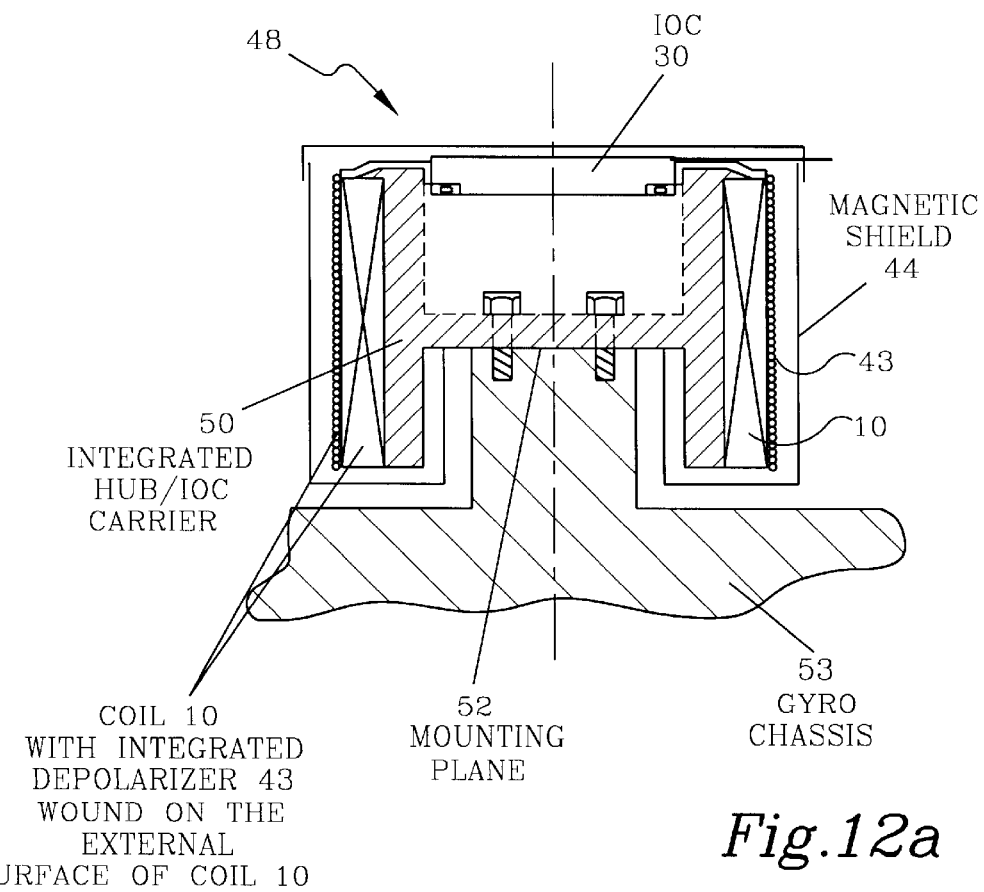
Figure 13B:
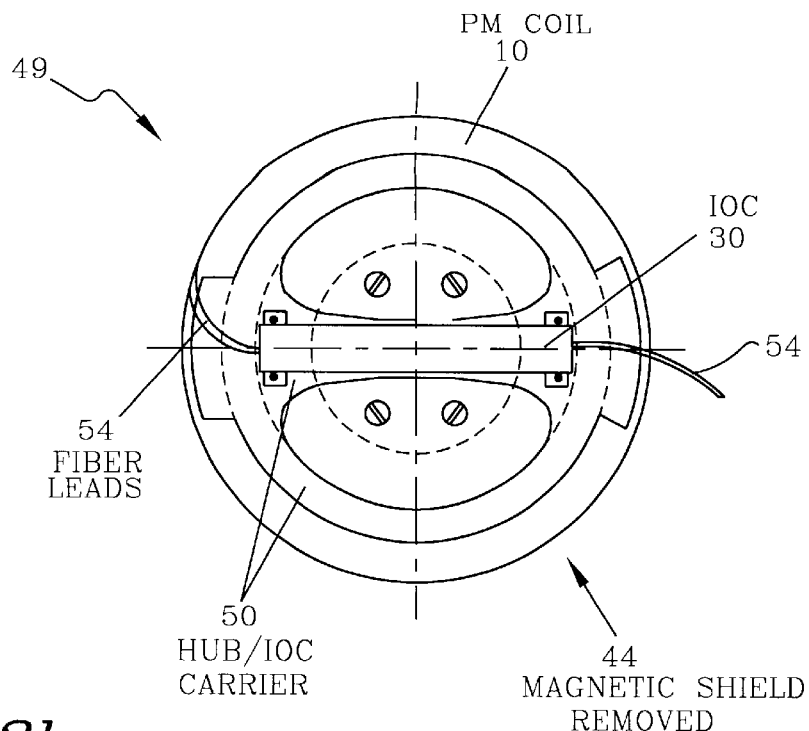
FIGS. 13*a* and 13*b* reveal an improved package for a polarization maintaining fiber optic gyroscope.
Figure 13A:
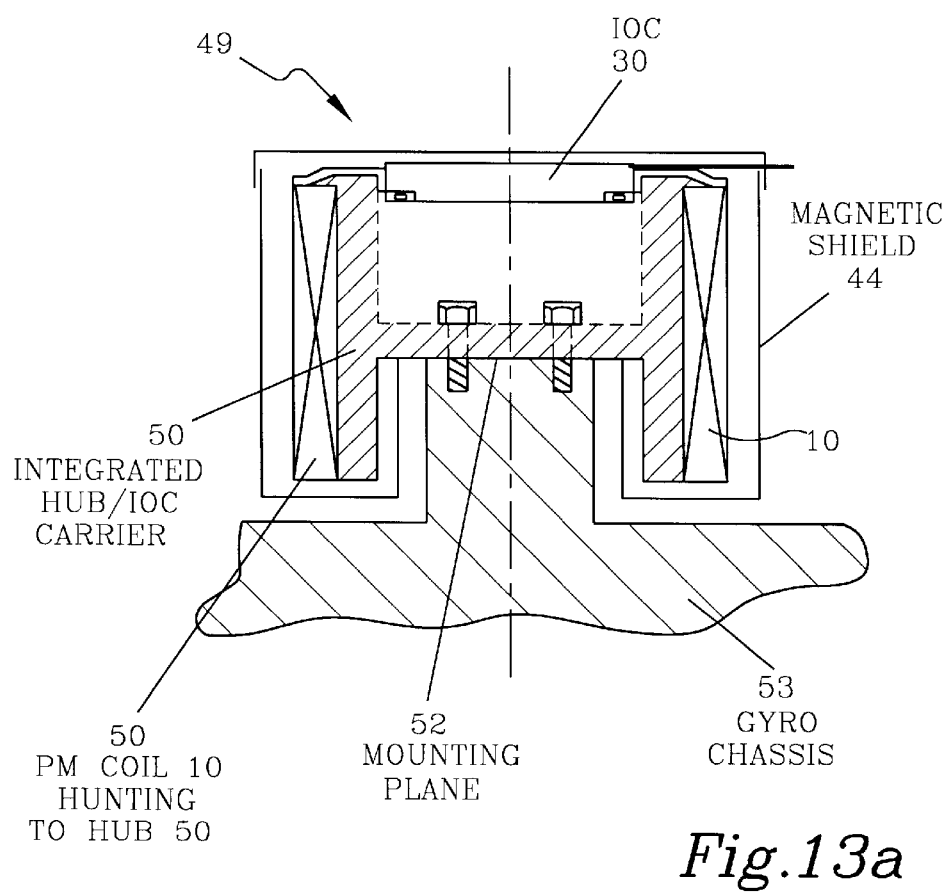

These figures show three examples of modular interferometer loop designs optimized for reduced sensitivity to vibration. FIGS. 11a and 11b reveal single a mode gyroscope architecture 47 having a depolarizer 43 mounted axially to the top surfaces of a coil 10, with an IOC 30 attached to a rigid carrier 51. FIGS. 12a and 12b show a single mode gyroscope architecture 48 having depolarizer 43 wound as a coil layer, with IOC 30 mounted directly a to the hub 50. FIGS. 13a and 13b show a PM gyroscope architecture 49 having coil 10 and IOC 30 attached to the same carrier 50. These architectures are mounted to a gyroscope chassis 53, respectively. There is no depolarizer within the interferometric loop.

Each package of a single axis, depolarized gyroscope has a hub 50, a sensing coil 10, a depolarizer 43, an integrated optics circuit 30 and a magnetic shield 44. The magnetic shield is in lieu of a shell 48. Hub 50 of sensing coil 10 is a thick-walled cylinder with an inner mounting plane or plate 52 located at an equal distance from the both ends of coil 10. This hub 50 geometry is selected to minimize axial thermal gradients in sensing coil 10 and to assure the superior performance of the gyroscope during thermal transients. Hub 50 is designed as a resonance-free structure within an operating frequency range. A self-supporting sensing coil 10 is bonded to hub 50 by using a very thin layer of vibration damping adhesive. The depolarizer is packaged in a form of a self-supporting coil 43 attached to the flat end of sensing coil 10 (FIGS. 11a and 11b). Alternatively, the depolarizer may be wound as a continuation of the sensing coil 10 wind pattern in a form of one or more coil layers bonded to the outer surface of coil 10 (FIGS. 12a and 12b). IOC chip 30 is mounted to a carrier 51. As it is shown in FIGS. 12a and 12b, the carrier can be formed as an integral part of hub 50 or as a separate rigid, resonance-free bracket 51 firmly attached to hub 50 (FIGS. 11a and 11b). All of the components in the interferometer loop are typically enclosed by a magnetic shield 44 (FIGS. 11a, 11b, 12a and 12b) to reduce related bias sensitivity of the loop (i.e., the Faraday effect).

An example of a polarization maintaining gyroscope packaging is shown in FIGS. 13a and 13b. The main difference between this design 49 and previous designs 47 and 48, respectively, shown in FIGS. 11a, 11b, 12a and 12b, is the lack of depolarizer fiber or a depolarizer micro-coil 43. In PM gyroscope configuration 49, sensing coil 10 is directly connected to fiber leads 54 of integrated optics chip 30.

All of the present designs allow for a significant reduction of differential dynamic strain in the interconnecting fiber sections between coil 10, depolarizer 43 (the SM gyroscope only) and IOC chip 30. The sections of interconnecting fibers 54 (i.e., leads) are designed to be very short, have equal lengths and are bonded together to common, rigid, supportive structures (i.e., coil 10, hub 50 and IOC carrier 30). An additional improvement in vibration gyroscope performance is accomplished by the considered gyroscope packaging examples through a reduction of the differential dynamic displacement of the adjacent components along the routing path of interconnecting fiber. A vibration damping gel is applied and used to attenuate residual dynamic strain effects in a pair of fiber leads when they transit signals from one to another supporting element.

Some devices, such as a light source 68 in FIG. 15a, with an optical fiber pigtail 70, have a boot 69 that provides the greatest rigidity at structure 68 or base 71 of boot 69 for optical fiber 70. The rigidity tapers off with distance from structure 68. However, for reducing vibration of leads, an epoxy, potting or other adhering material 60 is applied to lead or leads 70 to reduce their vibration relative to structure 68 that they originate from, and to support 67 of structure 68, as shown in FIG. 15b. This material is applied in a tapered fashion inversely proportional with distance from structure 68. Vibrating optical fiber leads 70 tend to cause phase shift of light propagating in optical fiber leads 70, which lead to errors, for instance, in a gyroscope output. For one cycle of vibration, there are two phase shifts thus resulting in the phase shift being a second harmonic of the mechanical vibration. Adhering material 60 has two material properties—an energy dissipation factor and a Young's modulus. Material 60 also has a design property that is a cross-section 72, which varies inversely with length of fiber 70 from its connection to device 68. As shown by FIG. 15b and cut-away 73 of FIG. 15c, cross-section 72 is perpendicular to a longitudinal axis 74 of optical fiber 70. The dissipation factor absorbs the energy of movement to reduce the overall mechanical energy of optical fiber lead or leads 70. This amounts to damping of the leads. Young's modulus for the material would ordinarily be below 3.5 million pascals (≈500 psi), but it could be as high as 7.5 million pascals (≈1000 psi) for certain applications. The correlation of a dissipation factor with Young's modulus varies from one kind of material 60 to another.

There is a special kind of bonding fiber of leads 70 to carrier 67. Ideally, fiber 70 should be bonded continuously along its axis 74 with tapered sections at the fiber lead ends 75. If instead the discrete fiber bonding method is selected to attach fiber lead 70 to carrier 67 (for instance to improve thermal performance of the sensor), the bonds should be formed with tapered ends 75 along fiber 70 axis 74 (symmetric teardrop). It reduces the dynamic contact strain gradients at boundaries of the adhesive 60 bond and fiber 70.

Figure 15D:
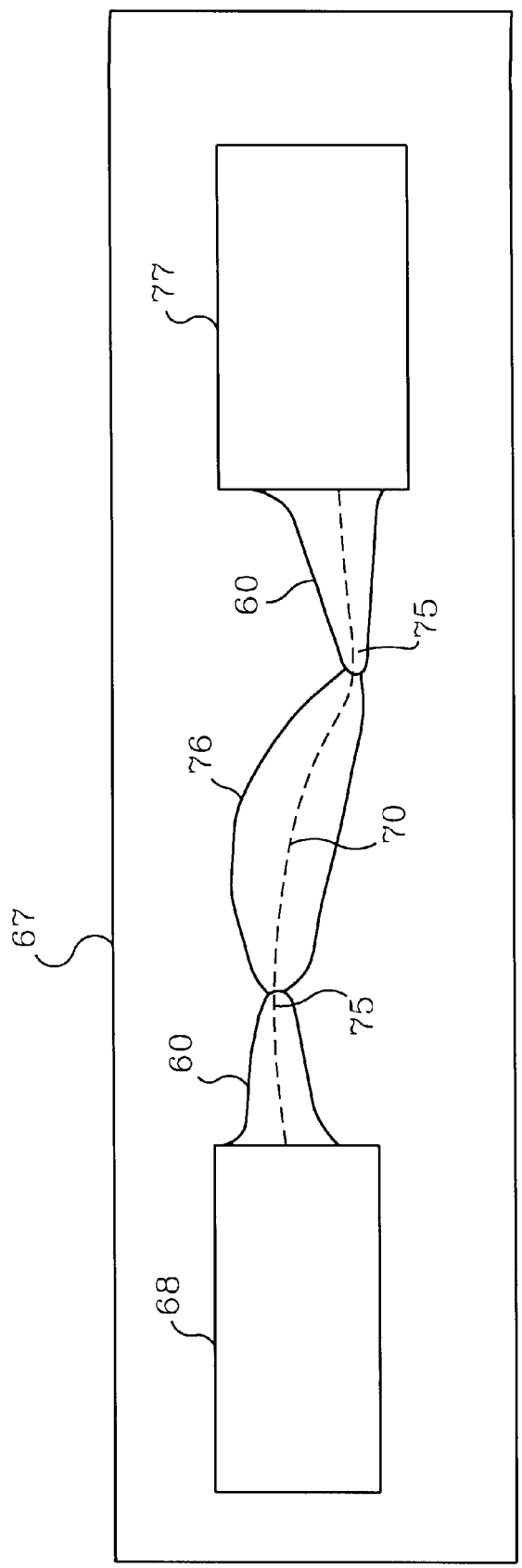

In addition, the entire fiber 70 length must be potted with a vibration damping material 76 restricting dynamic displacement of fiber, as shown in FIG. 15d. The Young's modulus of the potting material should be sufficient to minimize inertial effects induced by the mass of potting material 76 and fiber 70. The approach is used for attaching fiber lead 70 bonded to two rigid mechanical interfaces of structures 68 and 77, experiencing relative dynamic displacement perpendicularly to longitudinal fiber axis 74 (e.g., routing a fiber lead straight through the gap between two mechanical interfaces subjected to differential displacement or deformations). A preferred lead attachment material 76 should avoid stretching of fiber 70 at the displacement extremes. It should also provide the means of reducing the flexural contact strain at the boundaries of the mechanical interfaces through distributing it over a longer section of fiber lead 70. It may be accomplished through the encapsulating of fiber 70 with material 76, which has properties that vary along the bond length, which has greater rigidity midway of a interconnecting midsection fiber 70 (e.g., gradual change of Young's modulus of the UV (ultraviolet) curable encapsulant as a result of varying UV light exposure along the bonded area). Another method is to provide a gradual change of cross-sectional area of bonding material along fiber 70.

In the SM gyroscope architecture, the depolarizer fiber or micro-coil 43 is attached directly to sensing coil 10 (FIGS. 11a, 11b, 12a and 12b). This configuration creates an integrated (and lead-less) coil/depolarizer package 47, 48, which is practically free from vibration bias errors related to coil/depolarizer interconnections.

The above improved SM and PM gyroscope configurations 47, 48 and 49 show very low magnitudes of both first and second harmonic dynamic strain in the fiber resulting in significant reduction of vibration induced phase difference modulation.

Figure 14:
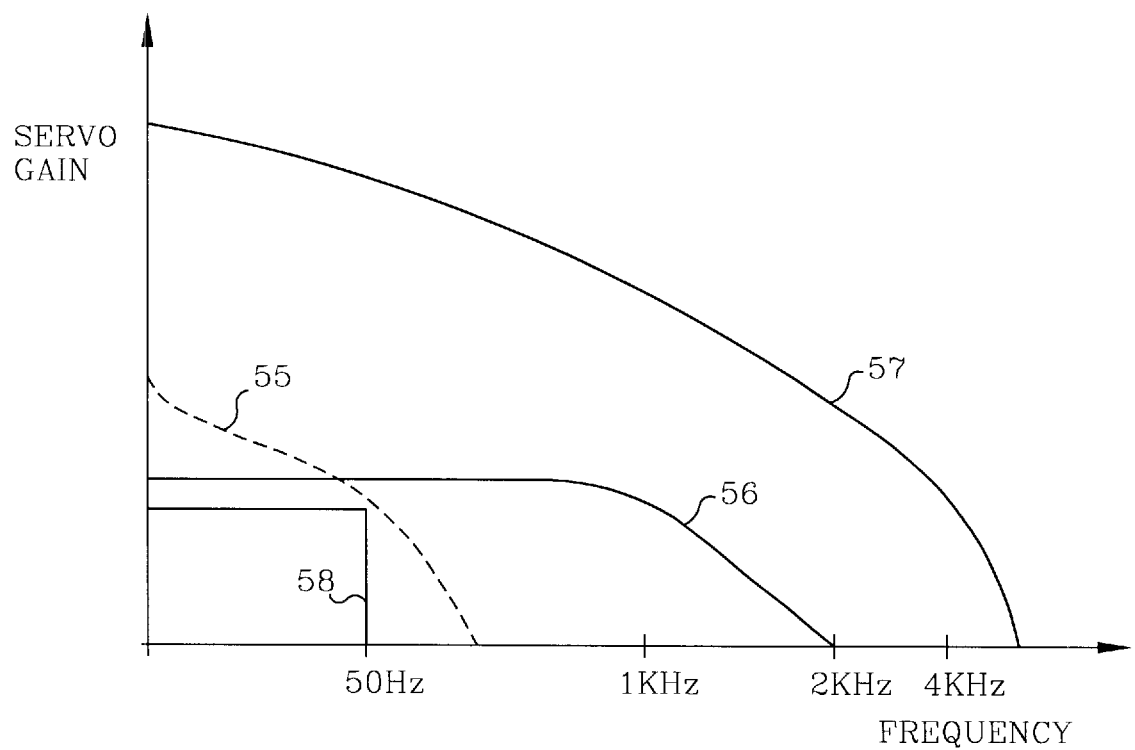
FIG. 14 shows the bandwidth considerations for the rate servo of a conventional fiber optic gyroscope and the necessary improvements for reduced vibration rectification errors.

Another last method of reducing vibration rectification errors is to increase the bandwidth of the primary rate servo so as to counteract the vibration induced phase shift $\delta$ at frequency $f_v$. FIG. 14, which is a graph of loop servo gain versus frequency, shows the relative bandwidths of interest. Conventionally, the primary purpose of the rate servo was to provide a feedback phase shift $\phi_f$ equal and opposite to that of the rotation rate to be measured. This is reflected in the following equation.

$$i = \begin{cases} \frac{1}{2} I_o \eta [1 + \cos(\phi_R + \phi_f)\cos|\phi_b| - \sin(\phi_R + \phi_f)\sin|\phi_b|] & t_1 \leq t < t_2 \\ \frac{1}{2} I_o \eta [1 + \cos(\phi_R + \phi_f)\cos|\phi_b| + \sin(\phi_R + \phi_f)\sin|\phi_b|] & t_2 \leq t < t_3 \end{cases}$$

The rotation rates of interest change slowly, the rotation rate range 58 is typically at rates of less than 100 Hz, such as 50 Hz. Thus, the necessary conventional rate loop bandwidth 55 is at most a few hundred Hz, as shown in FIG. 14.

However, by expanding the loop bandwidth to an improved loop bandwidth 57 to have considerable gain up to frequencies (i.e., greater than 4 kHz) beyond that of the expected vibration spectrum 56, one may attenuate the net phase shift at $f_v$ and $2f_v$, and therefore attenuate the DC bias error. That is, the photo detector current would be modified for a closed loop system to give $$i = \frac{1}{2} I_o \eta (1 + \cos[\phi_b \cos\omega_b t + (\delta_1 + \delta_2 + \phi_R + \phi_f)])$$

for the case of sinusoidal modulation, for example. It is possible to construct a rate servo that has sufficiently high bandwidth so that the phase shift $\phi_f$ will not only contain a low frequency component $\phi_{fo}$ that is equal and opposite to $\phi_R$, but also a high frequency component $\Delta\phi_f$ at frequency $f_v$, and $\Delta\phi_{2f}$ at frequency $2f_v$. These latter terms will produce oppositely directed phase shifts to those of the vibration-induced phase modulations at $f_v$ and $2f_v$. Thus, the photo detector current may be represented as, $$i = \frac{1}{2} I_o \eta (1 + \cos[\phi_b \cos\omega_b t + [\Delta\phi_v \cos(\omega_v t) + \Delta\phi_f \cos(\omega_v t + \beta_1)] + [\Delta\phi_{2v}\cos(\omega_v t + \epsilon) + \Delta\phi_{2f}\cos(2\omega_v t + \beta_2)] + \phi_R + \phi_{fo}])$$

where $\beta_1$ and $\beta_2$ represent the phase angle of the feedback signal of $f_v$ and $2f_v$, respectively. The net optical phase shift $\Delta\phi_{nv}$ at $f_v$ is a combination of two terms shown in the above equation.

$$\Delta\phi_{nv}\Delta\phi_v \cos(\omega_v t + \epsilon) + \Delta\phi_f \cos(\omega_v t + \beta)$$

A similar equation immediately above can be written for the net phase shift at $2f_v$. As the bandwidth of the rate loop is increased, $\Delta\phi_f$ and $\Delta\phi_{2f}$ approach values of $\Delta\phi_v$ and $\Delta\phi_{2v}$, respectively; $\beta_1$ and $\beta_2$ approach $\epsilon + \pi$. Hence, the net phase difference modulation $\Delta\phi_{nv}$ at $f_v$ and $\Delta\phi_{n2v}$ at $f_{2v}$ approach zero. By substituting $\Delta\phi_{nv}$ for $\Delta\phi_v$ and $\Delta\phi_{n2v}$ for $\Delta\phi_{2v}$ in the equation below, one can see that the rectification term vanishes as $\Delta\phi_{nv}, \Delta\phi_{n2v} \rightarrow 0$.

$$V_f(\omega_b) = V_{io} \cos(\omega_b t) \cos \epsilon \Delta\phi_{2v} (\Delta\phi_v)^2$$

Thus, in this invention, a related method of eliminating or reducing vibration rectification errors is to greatly increase the bandwidth of the rate feedback loop, well beyond that needed for rotation sensing, to beyond the expected vibration spectrum, and even to have gain at frequencies beyond twice the vibration spectrum. The frequency relationship is shown in FIG. 14. This technique may be used in combination with the aforementioned packaging, potting and damping techniques discussed above. Similarly, it may be used with square wave modulation schemes. Finally, it must be noted that for simplicity, the above discussion focused on sinusoidal vibration inputs. In reality, a real environment contains a superposition of sinusoidal vibration inputs, known as a random or more precisely a pseudo-random vibration spectrum. In this case, the cumulative rectified error is a combination of error contributions from arising from vibration at various frequencies. Each error contribution is a result of a non-zero net optical phase shift at specific frequencies and adjacent harmonics excited by the spectrum of the vibration frequency. The techniques described here for eliminating rectification at single frequencies also apply simultaneously to a spectrum of frequencies, i.e., to a random vibration input.

What is claimed is:

1. A vibration suppressing structure for a fiber optic gyroscope, comprising:

a first optical fiber arranged into a first plurality of concentric cylindrical layers, each of the concentric layers having a plurality of turns of said first optical fiber, and each of the turns arranged into a first predetermined winding pattern;

a second optical fiber arranged into a second plurality of concentric cylindrical layers, each of the concentric layers having a plurality of turns arranged into a second predetermined winding pattern; and a support structure comprising:

a spool for supporting the turns of said first optical fiber and the turns of said second optical fiber; and a circuit carrier attached to a first end of said spool, wherein said circuit carrier is attached to an integrated optical circuit, and wherein:

said first and second optical fibers have optical fiber leads fastened to said circuit carrier;

said integrated optical circuit has optical fiber leads fastened to said circuit carrier;

each of the optical fiber leads of said integrated optical circuit is fastened with a portion of adhering material to said circuit carrier, such that each of the optical fiber leads of said integrated optical circuit is provided a first stiffness relative to said circuit carrier, and the first stiffness decreases with distance from said integrated optical circuit; and each of the optical fiber leads of said first and second optical fibers is fastened with a portion of adhering material to said support structure, such that each of the optical fiber leads of said first and second optical fibers is provided with a second stiffness relative to said support structure, and the second stiffness decreases with distance from said first and second fibers.

2. The vibration suppressing structure of claim 1, wherein the first stiffness and the second stiffness at a point along each of the optical fiber leads of said integrated optical circuit and of said first and second optical fibers, respectively, are each proportional to a modulus of elasticity of the adhering material and a cross-sectional area of the adhering material perpendicular to a longitudinal axis of the respective optical fiber lead at the point along the optical fiber lead, and the cross-sectional area decreases with distance from said integrated optical circuit, and from said first and second optical fibers, respectively.

3. The vibration suppressing structure of claim 1, wherein the first and second stiffness at a point along each of the optical fiber leads of said integrated circuit and of said first and second optical fibers, respectively, are each a product of a modulus of elasticity of the adhering material and a cross-sectional moment of inertia of the adhering material perpendicular to a longitudinal axis of the optical fiber lead at the point along the optical fiber lead, and the cross-sectional moment of inertia decreases with distance from said integrated circuit, and said first and second optical fibers, respectively.

4. The vibration suppressing structure of claim 1, wherein the first stiffness and the second stiffness have a dissipation factor such that movement of the optical fiber leads of said integrated circuit and of said first and second optical fibers, respectively, relative to said support structure is limited to a predetermined level.

5. The vibration suppressing structure of claim 1, wherein the adhering material at a point along each of the optical fiber leads of said integrated circuit and of said first and second optical fibers, respectively, has a strain gradient across a cross-section of the portion of the adhering material approximately perpendicular to a longitudinal axis of the respective optical fiber lead at the point along the optical fiber lead, and the strain gradient decreases with distance from said integrated circuit, and said first and second optical fibers, respectively.

6. The vibration suppressing structure of claim 1, wherein the adhering material at a point along each of the optical fiber leads of said integrated optical circuit and of said first and second fibers, respectively, reduces the fiber strain or its gradient perpendicular to a longitudinal axis of the bonded optical fiber lead to a predetermined level, and the strain or its gradient decreases with distance from said circuit, and said first and second optical fiber, respectively.

7. A vibration suppressing structure for a fiber optic gyroscope, comprising:
a hub;
an optical fiber sensing coil wound on said hub, and having first and second fiber end leads;
an integrated optical circuit fastened to a first end of said hub, and having first and second fiber leads connected to the first and second leads of said optical fiber sensing coil, respectively;
a shell enclosing said hub, sensing coil and integrated optical circuit, and fastened to said hub; and
wherein:
the first and second fiber end leads of said sensing coil, are fastened to said hub;
the first and second fiber leads of said integrated optical circuit, are fastened to said hub;
said shell is at least partially filled with a damping material to suppress relative movement between said hub, said integrated optical circuit and said shell.

8. The vibration suppressing structure of claim 7, wherein said damping material has a dissipation factor of sufficient value to limit the relative movement to a predetermined level.

9. The vibration suppressing structure of claim 7, wherein said damping material has a modulus of elasticity of sufficient value to limit the relative movement to a predetermined level.

10. The vibration suppressing structure of claim 8, further comprising an optical fiber depolarizer coil wound on said hub.

11. The vibration suppressing structure of claim 9, further comprising an optical fiber depolarizer coil wound on said optical fiber sensing coil.

12. A vibration suppressing structure for a fiber optic gyroscope, comprising:
a support structure comprising:
an at least partially hollow cylinder having first and second ends, walls and a longitudinal axis approximately parallel to and approximately equidistant from the walls of said cylinder; and
an at least one approximately planar surface situated within said cylinder between the first and second ends, and approximately perpendicular to the longitudinal axis;
an integrated optical circuit fastened to the planar surface;
a sensing coil situated on said support structure; and
a depolarizer coil situated on said support structure.

13. The vibration suppressing structure of claim 12, further comprising a shield enclosing said support structure, said integrated optical circuit, said sensing coil and said depolarizer coil.

14. The vibration suppressing structure of claim 12, wherein:
said integrated optical circuit has a first lead connected to a first lead of said depolarizer coil and a second lead connected to a first lead of said sensing coil;
said depolarizer coil has a second lead connected to a second lead of said sensing coil; and
each of the first leads and the second leads of said depolarizer and sensing coils and said integrated optical circuit, is fixed to said support structure with an adhering material.

15. The vibration suppressing structure of claim 14, wherein space between an inner surface of said shield and said support structure, said integrated optical circuit, said sensing coil and said depolarizer coil is at least partially filled with a damping material.

16. The vibration suppressing structure of claim 15, wherein said damping material has a modulus of elasticity sufficient to limit relative movement between said support structure, said integrated optical circuit, said sensing coil and said depolarizer coil to a predetermined level.

17. The vibration suppressing structure of claim 15, wherein said damping material has a dissipation factor sufficient to limit relative movement between said support structure, said integrated optical circuit, said sensing coil and said depolarizer coil to a predetermined level.

18. The vibration suppressing structure of claim 15, wherein said damping material has a modulus of elasticity adequate to suppress first and second harmonics of a differential dynamic strain induced in said sensing coil, said depolarizer coil, and first and second leads of said sensing coil and of said depolarizer coil, caused by forces affecting the vibration suppressing structure, to a predetermined level.

19. The vibration suppressing structure of claim 15, wherein said damping material has a dissipation factor adequate to suppress first and second harmonics of a differential dynamic strain induced in said sensing coil, said depolarizer coil and first and second leads of said sensing coil and of said depolarizer coil, to a predetermined level.

20. The vibration structure of claim 15, wherein said damping material has a stiffness sufficient to limit relative movement between said support structure, said integrated optical circuit, said sensing coil and depolarizer coil to a predetermined level.

21. The vibration suppressing structure of claim 15, wherein said damping material has a stiffness adequate to suppress first and second harmonics of a differential dynamic strain induced in said sensing coil, said depolarizer coil and first and second leads of said sensing coil of said depolarizer coil, to a predetermined level.

22. The vibration suppressing structure of claim 14, wherein the adhering material fixing each of the first leads and second leads of said depolarizer and sensing coils, and said integrated circuit, applies a strain between each lead and said support structure, the strain being greater for each lead closer to said integrated optical circuit, said depolarizer coil and said sensing coil, respectively.

23. The vibration suppressing structure of claim 14, wherein the adhering material fixing each of the first leads and second leads of said depolarizer and sensing coils, and said integrated circuit, reduces dynamic differential strain in each pair of leads to a predetermined level.

24. The vibration suppressing structure of claim 14, wherein the adhering material fixing each of the first leads and second leads of said depolarizer and sensing coils, and said integrated circuit, applies a stiffness between each lead and said support structure, and the stiffness decreases with distance from said depolarizer and sensing coils, and said integrated circuit, respectively.

25. The vibration suppressing structure of claim 14, wherein the adhering material fixing each of the first leads and second leads of said depolarizer and sensing coils, and said integrated circuit, applies a stiffness that is a product of a modulus of elasticity of the adhering material and a cross-sectional area of the adhering material perpendicular to a longitudinal axis of the respective optical fiber lead, and the cross-sectional area decreases with distance from said depolarizer and sensing coils, and said integrated circuit, respectively.

26. The vibration suppressing structure of claim 14, wherein the adhering material fixing each of the first leads and second leads of said depolarizer and sensing coils, and said integrated circuit, applies a stiffness that is a product of a modulus of elasticity of the adhering material and a cross-sectional moment of inertia of the adhering material perpendicular to a longitudinal axis of the respective optical fiber lead, and the cross-sectional moment of inertia decreases with distance from said depolarizer and sensing coils, and said integrated circuit, respectively.

27. The vibration suppressing structure of claim 14, wherein the adhering material fixing each of the first leads and second leads of said depolarizer and sensing coils, and said integrated circuit, applies a stiffness that has a dissipation factor such that movement of the first leads and second leads of said depolarizer and sensing coils, and said integrated circuit, relative to said support structure is limited to a predetermined level.

28. The vibration suppressing structure of claim 14, wherein the adhering material at a point along each of the first and second leads of said depolarizer and sensing coils, and said integrated circuit, has a strain gradient across a cross-section of the adhering material approximately perpendicular to a longitudinal axis of the respective lead, and the strain gradient decreases with distance from said depolarizer and sensing coils, and said integrated circuit, respectively.

29. The vibration suppressing structure of claim 13, wherein a second planar surface within said cylinder is fixed to a gyroscope chassis.

30. The vibration suppressing structure of claim 29, wherein said shield is a magnetic shield.

31. A fiber optic gyroscope comprising:
a support structure;
a sensing coil would on said support structure;
an integrated optical circuit mounted on said support structure and connected to said sensing coil;
a light source coupled to said integrated optical circuit;
a light detector coupled to said integrated optical circuit; and
an electronics circuit connected to said light detector and to said integrated optical circuit;
wherein:
said light source is configured to provide light to said integrated optical circuit which splits the light into two light beams that counter-propagate in said sensing coil; and
vibration causes phase difference modulation of the two beams in said sensing coil at first and second harmonics of a frequency of a vibration; and
wherein:
said electronics circuit provides a closed-loop feedback to a phase modulator in said integrated optical circuit to reduce a phase difference between the two light beams in said sensing loop; and
said electronics circuit has a bandwidth at a value sufficient to limit the first harmonic of the phase difference modulation to a predetermined value of magnitude.

32. The gyroscope of claim 31, wherein said electronics circuit has a bandwidth at a value sufficient to limit the second harmonic of the phase difference modulation to a predetermined value of magnitude.

33. The gyroscope of claim 31, wherein:
said sensing coil, and said integrated optical circuit have optical fiber leads for optical connections; and
the optical fiber leads are fastened to said support structure.

34. The gyroscope of claim 33, wherein:
the optical fiber leads are fastened to said support structure with an adhering material applied to each optical fiber lead; and
the adhering material, fastening each of the optical fiber leads of said integrated optical circuit, and some of the other components attached to or mounted on said support structure, applies a strain between each lead and said support structure, the strain being greater for each lead closer to said integrated circuit and some of the other components, respectively.

35. The gyroscope of claim 33, wherein the adhering material fastening each of the optical fiber leads of said integrated optical circuit and some of the other components attached to or mounted on said support structure, applies a stiffness between each optical fiber lead and said support structure, the stiffness decreases with distance from said integrated circuit and some of the other components, respectively.

36. The gyroscope of claim 33, wherein the adhering material fastening each of the optical fiber leads of said integrated optical circuit and some of the other components attached to or mounted on said support structure, applies a stiffness that is a product of a modulus of elasticity of the adhering material and a cross-sectional area of the adhering material perpendicular to a longitudinal axis of the respective optical fiber lead, and the cross-sectional area decreases with distance from said integrated optical circuit and some of the other components, respectively.

37. The gyroscope of claim 33, wherein the adhering material fixing each of the optical fiber leads of said integrated optical circuit and some of the other components attached or mounted on said support structure, applies a stiffness that is a product of a modulus of elasticity of the adhering material and a cross-sectional moment of inertia of the adhering material perpendicular to a longitudinal axis of the respective optical fiber lead, and the cross-sectional moment of inertia decreases with distance from said integrated optical circuit and some of the other components, respectively.

38. The gyroscope of claim 33, wherein the adhering material fixing each of the optical fiber leads of said integrated optical circuit and some of the other components attached or mounted on said support structure, applies a stiffness that has a dissipation factor such that movement of the optical fiber leads of said integrated optical circuit and same of the other components, relative to said support structure is limited to a predetermined level.

39. The gyroscope of claim 33, wherein the adhering material along at least a portion of length of each of the optical fiber leads of said integrated optical circuit and some of the other components attached or mounted on said support structure, has a strain gradient across a cross-section of the adhering material approximately perpendicular to a longitudinal axis of the respective lead, and the strain gradient decreases with distance from said integrated optical circuit and some of the other components, respectively.

40. The vibration suppressing structure of claim 33, wherein the adhering-material at a point along each of the optical fiber leads of said integrated optical circuit and of said first and second fibers, respectively, reduces the fiber strain or its gradient perpendicular to a longitudinal axis of the bonded optical fiber lead to a predetermined level, and the strain or its gradient decreases with distance from said circuit, and said first and second optical fiber, respectively.

41. The gyroscope of claim 33, wherein said light source and light detector are mounted on said support structure.

42. The gyroscope of claim 41, wherein said sensing coil is bonded to said support structure with a layer of adhesive.

43. The gyroscope of claim 42, wherein said shell is a magnetic shield.

44. The gyroscope of claim 43, wherein said support structure is a partially hollow cylinder having a mounting plane perpendicular to and in the vicinity of a longitudinal axis that is parallel to and equidistant from an external cylindrical surface upon which said sensing coil is wound.

45. The gyroscope of claim 44, wherein the mounting plane is approximately equidistant from ends of said sensing coil.

46. The gyroscope of claim 45, wherein said damping material displaces nearly all space within said shell and covers all of the components and the optical fiber leads.

47. The gyroscope of claim 46, further comprising a depolarizer coil wound on said support structure and connected between said integrated optical circuit and at least one end of said sensing coil.

48. The gyroscope of claim 47, wherein said depolarizer coil is bonded to said support structure with a layer of adhesive.

49. The gyroscope of claim 46, further comprising a depolarizer coil wound on said sensing coil and connected between said integrated optical circuit and at least one end of said sensing coil.

50. The gyroscope of claim 49, wherein said depolarizer coil is bonded to said sensing coil with a layer of adhesive.

51. A fiber optic gyroscope comprising:
   a light source;
   an integrated circuit comprising:
      a splitter coupled to said light source; and
      at least one modulator;
   a light detector coupled to said splitter; and
   an electronics circuit connected to said light detector and to said at least one modulator; and
   wherein:
      said light source is providing light to said splitter which splits the light into two light beams that counter-propagate in said sensing coil;
      vibration causes phase difference modulation of the two beams in said sensing coil at least one harmonic of a frequency of a vibration;
      said electronics circuit provides closed-loop feedback to said at least one modulator to reduce a phase difference between the two light beams that counter-propagate in said sensing loop; and
      said electronics circuit has a bandwidth at a value sufficient to limit the first harmonic of the phase difference modulation to a predetermined value of magnitude.

52. The gyroscope of claim 51, wherein said electronics circuit has a bandwidth at a value sufficient to limit the second harmonic of the phase difference modulation to a predetermined value of magnitude.

53. The gyroscope of claim 51, wherein the bandwidth of said electronics circuit is greater than the spectrum of the vibration.

\* \* \* \* \*